US011256261B1

(12) United States Patent
Bai et al.

(10) Patent No.: US 11,256,261 B1
(45) Date of Patent: Feb. 22, 2022

(54) SYSTEM FOR MOVEMENT OF AUTONOMOUS MOBILE DEVICE

(71) Applicant: AMAZON TECHNOLOGIES, INC., Seattle, WA (US)

(72) Inventors: Shi Bai, Sunnyvale, CA (US); Saurabh Gupta, Sunnyvale, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 285 days.

(21) Appl. No.: 16/162,133

(22) Filed: Oct. 16, 2018

(51) Int. Cl.
*G05D 1/02* (2020.01)
*G01C 21/34* (2006.01)

(52) U.S. Cl.
CPC ......... *G05D 1/0214* (2013.01); *G05D 1/0223* (2013.01); *G05D 1/0246* (2013.01); *G05D 1/0274* (2013.01); *G01C 21/3453* (2013.01); *G01C 21/3461* (2013.01); *G05D 2201/02* (2013.01)

(58) Field of Classification Search
CPC .. G05D 1/0214; G05D 1/0223; G05D 1/0246; G05D 1/0274; G05D 2201/02; G01C 21/3453; G01C 21/3461
See application file for complete search history.

(56) References Cited

U.S. PATENT DOCUMENTS 9,829,333 B1 * 11/2017 Calder .................. G08G 1/166
10,093,021 B2 * 10/2018 Aghamohammadi ...................... G05D 1/0274
2005/0131581 A1 * 6/2005 Sabe .................... G05D 1/0274 700/245
2005/0187678 A1 * 8/2005 Myeong ............... G05D 1/0255 701/27
2006/0149465 A1 * 7/2006 Park ..................... G05D 1/0217 701/416
2007/0027612 A1 * 2/2007 Barfoot .................. G05D 1/024 701/117
2015/0261786 A1 * 9/2015 Xu ...................... G06F 16/2246 707/747
2016/0297072 A1 * 10/2016 Williams ............. G05D 1/0234
2016/0379092 A1 * 12/2016 Kutliroff .............. G05D 1/0217
2017/0157769 A1 * 6/2017 Aghamohammadi ...................... G05D 1/0217
2017/0285648 A1 * 10/2017 Welty ................... G05D 1/0248
2017/0344007 A1 * 11/2017 Song .................... G05D 1/0274
2018/0188037 A1 * 7/2018 Wheeler ................. H04L 67/12
2018/0267540 A1 * 9/2018 Sonoura ............... G05D 1/0274
2018/0306922 A1 * 10/2018 Wan ........................ G01S 19/42
2019/0339080 A1 * 11/2019 Bao ........................ G01C 21/20
(Continued)

FOREIGN PATENT DOCUMENTS

WO WO2018133805 A1 * 7/2018 ........... G05D 1/0274

*Primary Examiner* — Dale W Hilgendorf
(74) *Attorney, Agent, or Firm* — Lindauer Law, PLLC

(57) ABSTRACT

A system determines one or more constraint locations that are present in an environment. A constraint location is a location in the environment through which a user, pet, or moving device is deemed likely to pass due to one or more physical constraints such as walls, furniture, and so forth. For example, a constraint location may be located at a midpoint of a doorway, or where a corridor narrows. Movement of an autonomous mobile device in an environment takes these constraint locations into consideration. In one implementation the autonomous mobile device is prevented from stopping within a threshold distance of a constraint location to avoid blocking movement of others.

20 Claims, 9 Drawing Sheets

(56) References Cited

U.S. PATENT DOCUMENTS

| | | | | |
|---|---|---|---|---|
| 2019/0339703 | A1* | 11/2019 | Bao .................... | G01C 21/3484 |
| 2020/0073399 | A1* | 3/2020 | Tateno et al. ........ | G05D 1/0214 |
| 2021/0278852 | A1* | 9/2021 | Urtasun et al. ...... | G05D 1/0214 |

* cited by examiner

| PAIRS 408 |
|---|
| (1,2) |
| (1,3) |
| (1,4) |
| (2,3) |
| (2,4) |
| (3,2) |
| (3,4) |

| CANDIDATE LOCATION 404 | PATH TRAVERSAL COUNT 410 |
|---|---|
| 1 | 0 |
| 2 | 0 |
| 3 | 3 |
| 4 | 0 |

SYSTEM FOR MOVEMENT OF AUTONOMOUS MOBILE DEVICE

BACKGROUND

Every day a user faces a variety of tasks both personal and work related that need to be attended to. These may include helping in the care of others such as children or the elderly, taking care of a home, staying in contact with others, and so forth. Devices that assist in these tasks may help the user perform the tasks better, may free up the user to do other things, and so forth.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
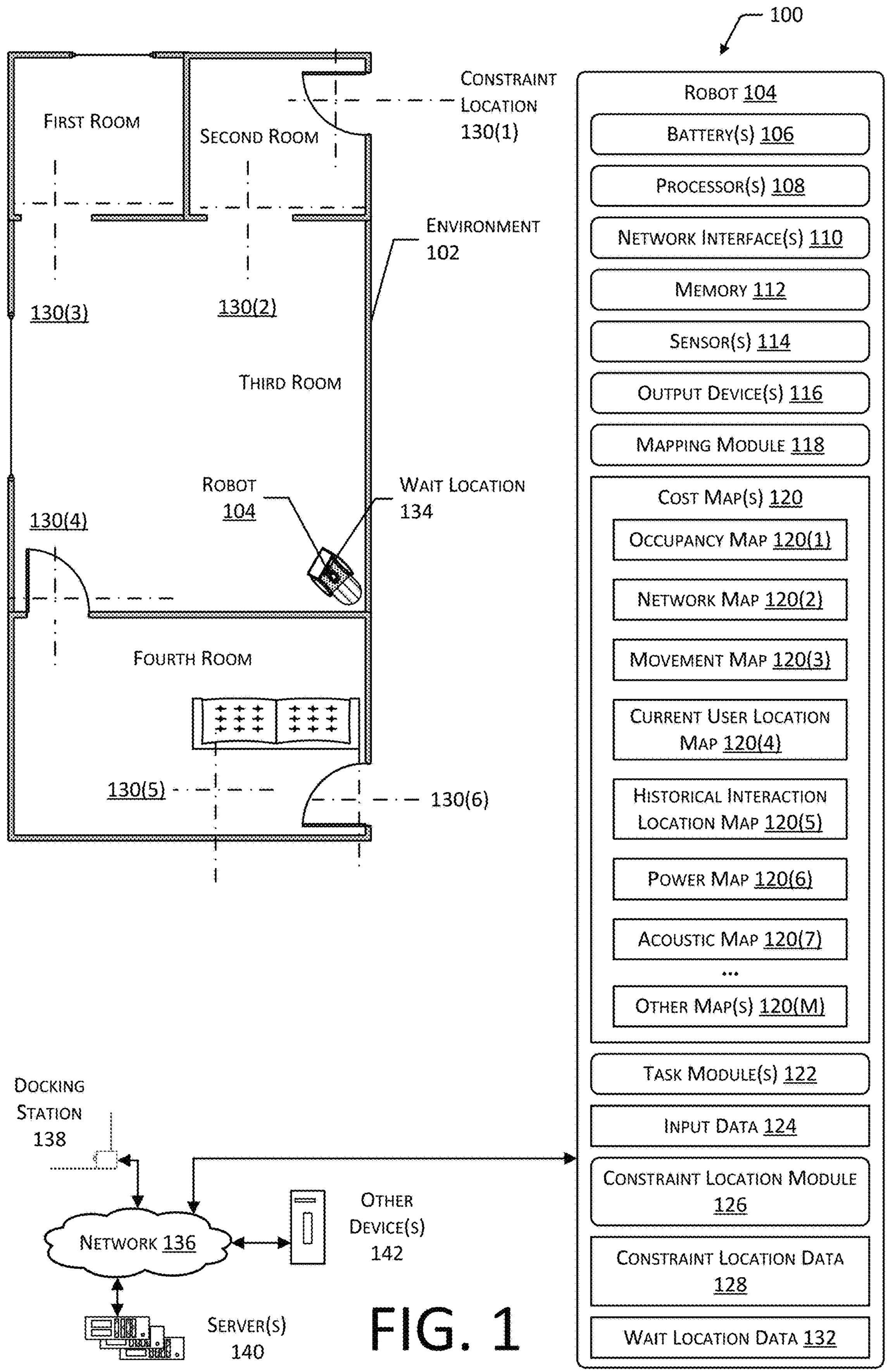
FIG. 1 illustrates a system in which constraint locations are determined in an environment and used to inform movement of an autonomous mobile device, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

During operation, an autonomous mobile device, such as a robot, may perform various tasks. The robot is capable of autonomous movement, allowing it to move from one location in the environment to another without being "driven" or remotely controlled by a user or other human. Some of the tasks the robot performs may involve the robot moving about an environment.

Movement of the robot may include one or more of a discretionary stop or a nondiscretionary stop. A discretionary stop may result from an instruction to stop at a certain point. In comparison, a nondiscretionary stop may result from a determination that the robot is attempting to avoid a collision with an unexpected object.

Within the environment constraint locations may be determined that are indicative of areas where greater levels of movement by users or other robots may be expected, that provide access to some area, and so forth. For example, users moving between two rooms connected by a single door are constrained to move through the door. A user walking around a corner in a hallway may tend to cut the corner rather than following near the opposite wall. In another example, a constraint location may be present at the end of a hallway where three doors are present.

Within the environment these constraint locations may be considered spots where others may be expected to traverse and where making a discretionary stop could have an adverse consequence. For example, a discretionary stop of the robot within a doorway would be inadvisable because the robot would then block at least part of the doorway.

The determination of these constraint locations provides useful information that may then be used to inform the movements of the robot. For example, if constraint locations are determined, no stopping areas may be associated with these constraint locations. The robot may be configured such that discretionary stops are prohibited within these no stopping areas. This prevents the robot from occupying these no stopping areas for any longer than necessary to traverse the no stopping area. As a result, safety within the environment is improved as the robot will not make a discretionary stop within this area. In some implementations, in the event of a nondiscretionary stop within the no stopping area, the robot may present output such as an audible sound, illuminating a light, and so forth, to warn others of its presence in that area.

Described in this disclosure are techniques and systems to determine constraint locations within an environment. Once determined, the movement of one or more autonomous mobile devices may be enforced using these constraint locations. For example, the route planning for the robot may be constrained to prevent discretionary stopping of the robot within the no stopping areas, to maintain a particular speed within the no stopping areas, and so forth.

The constraint locations may be determined using minimal information. In one implementation, an occupancy map is determined that is representative of obstacles within the environment such as walls, furniture, and so forth. The occupancy map may be determined using sensor data obtained by the robot during an exploration process, from a previously provided floorplan, and so forth.

A plurality of candidate locations may be designated throughout the environment as represented by the occupancy map. For example, a Sobol set may be used to pseudo randomly designate candidate locations throughout the environment. For example, the candidate locations may be distributed across an occupancy map of the environment.

The occupancy map provides information that is indicative of placement of obstacles in the physical environment. These obstacles may include an object or an aspect of an area that impedes movement of the robot. The occupancy map may indicate the presence of walls, furniture, shag carpet that would snarl the robot's wheels, and so forth by providing obstacle cost values for particular areas. For example, a high obstacle cost value may indicate a wall or piece of furniture that the robot is not able to pass through, while a low obstacle cost value may indicate a smooth flat floor.

Candidate locations are distributed such that they are not coexistent with an area having an obstacle cost value above a threshold value. In implementations where a high obstacle cost value indicates presence of an obstacle, the candidate locations may be limited to those areas with obstacle cost values less than a threshold value. For example, candidate locations that are within a wall, couch, or other object or aspect that would prevent the robot from being present at that location may be discarded from further consideration.

One or more graphs may be formed using the candidate locations. Pairs of candidate locations may be designated. For example, all possible pairs of candidate locations in the environment may be enumerated. A shortest path may be determined between each of the pairs. The path may comprise edges, or individual segments that extend from one candidate location to another. In some implementations, the path may comprise edges that satisfy one or more requirements. The requirements may include one or more of: straight edges (not curved), a clear line of sight from one candidate location to another with no intervening obstacles, the distance between two candidate locations is less than a threshold distance, the path comprises a minimum possible number of candidate locations, or the path comprises a minimum overall length comprising a sum of the length of all edges.

A candidate location may be deemed to be traversed by a path between a pair of candidate locations when associated with at least two edges for the same path. The candidate locations that comprise the pair would have a single edge associated with each, and thus would not be deemed to be traversed. In other implementations other techniques may be used to determine traversal.

A location score may be calculated. In one implementation, the location score may comprise a count of the path traversals of a particular candidate location. In other implementations other techniques may be used. For example, each edge may have an associated weight or value. The location score may comprise a sum of all weights of all edges associated with a particular candidate location.

The location score for a particular candidate location may be used to determine if the particular candidate location is a constraint location. For example, if the location score exceeds a threshold value, the candidate location associated with that score may be designated as a constraint location. In other implementations a candidate location that exhibits a local maxima of location score may be determined to be the constraint location.

Once constraint locations have been determined using the occupancy map, the robot or other sensors may be used to assess the constraint locations. The assessment may be used to remove a constraint location, expand a size of the no stopping area associated with that constraint location, and so forth. By using the constraint locations, the robot is able to more safely and effectively operate without blocking others.

Information about the constraint locations may also be used to otherwise assist in operation of the robot. For example, the autonomous mobile device may move to a wait location that is outside of, but within line of sight of, a constraint location. At this wait location, the robot may then await a command from the user to perform a task.

Illustrative System

FIG. 1 illustrates a system 100 in which constraint locations are determined in an environment 102 and used to inform movement of an autonomous mobile device (robot) 104, according to some implementations.

The robot 104 may include a battery(s) 106 to provide electrical power for operation of the robot 104. The battery 106 may be rechargeable, allowing it to store electrical energy obtained from an external source. In other implementations a wireless power receiver may be used to provide power for operation of the robot 104, recharge the battery 106, and so forth. The robot 104 may include a hardware processor(s) 108 (processors), a network interface(s) 110, a memory(s) 112, sensors 114, and output devices 116. These devices are discussed in more detail with regard to FIGS. 2 and 3.

A mapping module 118 may be stored in the memory 112. The mapping module 118 is used to generate one or more cost maps 120. A cost map 120 provides a cost value for a particular location, area, or volume within the environment 102. The cost value may be indicative of one or more of availability of a resource used by the robot 104, current location of users, historical locations of users, historical locations where an interaction with the robot 104 previously occurred, characteristics present in the environment 102, and so forth. While the cost maps 120 are depicted as grids with cells defining particular areas, in other implementations the cost maps 120 may be represented in other ways. For example, the cost map 120 may comprise a list, table, set of coordinates, and so forth. The mapping module 118 may use data from the sensors 114 or other devices to determine one or more of the cost maps 120.

The cost maps 120 may include an occupancy map 120(1) or other representation of the physical environment 102. For example, one or more cameras may obtain image data of the environment 102. The image data may be processed to determine the presence of obstacles. The occupancy map 120(1) may comprise data that indicates the location of one or more obstacles, such as a table, wall, and so forth. In some implementations, the occupancy map 120(1) may comprise a plurality of cells with each cell of the plurality of cells representing a particular area in the physical environment 102 and having an obstacle cost value that is indicative of whether the cell contains an obstacle. An obstacle may comprise an object or feature that prevents or impairs traversal of the robot 104. For example, an obstacle may comprise a wall, stairwell, and so forth.

A network map 120(2) may provide cost values that are indicative of availability of a wireless network. This may include one or more of received signal strength from an access point, connection speed, connection throughput, connection reliability, latency of data transfer, and so forth. An area with a greater cost value may provide better network performance than an area with a lower cost value. For example, the network map 120(2) may provide signal strength values for areas within the environment 102 as received by a receiver of the network interface 110. In one implementation, the cost value of the network map 120(2) may be based on a received signal strength indication (RSSI)

as generated by a Wi-Fi radio. A signal strength value that is greater than a threshold value may indicate that a wireless network access point is able to be used by the robot 104. In some situations, the robot 104 may use the wireless network to perform some tasks. For example, the wireless network may be used to establish communication between the robot 104 and a server that provides natural language processing of audio input, videoconferencing services, data retrieval, and so forth. In some implementations, data from other devices in the environment 102 may be used to generate the cost values in the network map 120(2). For example, if an internet enabled audio device, set top box (STB), and so forth are in the environment 102 and have radios, they may provide data that is used to generate the cost values for the network map 120(2).

A movement map 120(3) may provide cost values that are indicative of where others in the environment 102 have been, or have passed through. The movement map 120(3) may indicate a location of a person, other robot, pet, and so forth that was in motion. For example, the movement map 120(3) may provide information about what areas within the environment 102 at which one or more users have been detected in motion at one or more times. Continuing the example, the movement map 120(3) may include areas such as a route through a room from one door to another and omit areas at which users are at rest, such as chairs and beds.

The mapping module 118 may use data from the sensors 114 on the robot 104 or other sensors in the environment 102 to determine user location data indicative of a user location in the environment 102. The user location data may be indicative of coordinates within the environment 102 that are indicative of a point associated with the user. For example, the user location data may indicate a centroid of the area occupied by the user with respect to a fixed coordinate system used to represent locations within the environment 102.

A current user location map 120(4) provides cost values that are indicative of where in the environment 102 users currently are. For example, the current user location map 120(4) may indicate the areas in the environment 102 that are occupied by users who are standing, sitting, walking, and so forth.

A historical interaction location map 120(5) provides cost values that are indicative of where in the environment 102 others have previously interacted with the robot 104. In some implementations, the historical interaction location map 120(5) may provide cost values indicative of where the users, robots, pets, and so forth have previously interacted with other devices. These interactions may include, but are not limited to, a location of one or more of a user or a robot 104 when the user issued a command, provided input to an input device, and so forth. For example, the historical interaction location map 120(5) may indicate that the robot 104 frequently experiences an interaction at a spot near the front door.

A power map 120(6) may provide cost values that are indicative of where in the environment 102 electrical power is available to the robot 104. For example, the power map 120(6) may include the location of a charging station, electrical outlet, wireless charging location, or other device that allows the robot 104 to acquire energy for further operation. For example, if the robot 104 is able to plug itself into an alternating current outlet, the power map 120(6) may indicate electrical outlets.

An acoustic map 120(7) may provide information about sound levels measured at different areas in the environment 102. If the robot 104 accepts audible input, such as the user speaking a command, it is advantageous for the robot 104 to wait in locations that are quiet enough that the command can be detected and processed properly. For example, if the robot 104 is waiting in a very noisy area, it may not be able to hear a spoken command, or the spoken command may be so garbled with noise that it is unintelligible by the robot 104 or another system. The acoustic map 120(7) may be indicative of noise levels measured currently, at previous times, or a combination thereof. For example, the acoustic map 120(7) may be generated by the robot 104 sampling noise levels using a microphone while the robot 104 is in the environment 102.

Other cost maps 120(M) may be generated. An exclusion map may provide cost values that are indicative of where in the environment 102 the robot 104 is prohibited from travelling. For example, the exclusion map may designate the bathroom as a prohibited area and the robot 104 is not allowed to enter. In another example, a temperature map may provide information about ambient temperatures in different areas. In yet another example, an ambient light level map may provide information about how bright different areas are.

One or more task modules 122 may be stored in the memory 112. The task modules 122 may comprise instructions that, when executed by the processor 108 perform a task. For example, a video call module may be used to have the robot 104 find a particular user and present a video call using the output devices 116. In another example, a sentry task module 122 may be used to have the robot 104 travel throughout the home, avoid users, and generate a report as to the presence of an unauthorized person.

During operation the robot 104 may determine input data 124. The input data 124 may include sensor data from the sensors 114 onboard the robot 104. For example, the input data 124 may comprise a verbal command provided by the user and detected by a microphone on the robot 104.

In some situations, the task performed by the robot 104 may include moving the robot 104 within the environment 102. These tasks may involve various behaviors by the robot 104. These behaviors may include an approach behavior, a follow behavior, an avoid behavior, and so forth. For example, the robot 104 may be directed to perform a task that includes presenting a video call on a display output device 116 to a first user. This task may include an avoidance behavior causing the robot 104 to avoid another user while seeking out the first user. When found, the robot 104 uses an approach behavior to move near the first user.

A constraint location module 126 determines constraint location data 128 that is indicative of one or more constraint locations 130 within the environment. The constraint location module 126 may distribute candidate locations through at least a portion of the environment 102, such that they are not coexistent with an area having an obstacle cost value above a threshold value. In implementations where a high obstacle cost value indicates presence of an obstacle, the candidate locations may be limited to those areas with obstacle cost values less than a threshold value. For example, candidate locations that are within a wall, couch, or other object or aspect that would prevent the robot 104 from being present at that location may be discarded from further consideration.

The constraint location module 126 may generate data representative of or as one or more graphs, using the candidate locations. Pairs of candidate locations may then be designated. For example, all possible pairs of candidate locations in the environment 102 may be enumerated.

A shortest path may be determined between each of the pairs. In some implementations, the constraint location module 126 may implement one or more of the Dijkstra's algorithm, the A* search algorithm, the Floyd-Warshall algorithm, Johnson's algorithm, the Viterbi algorithm, and so forth to determine the shortest path between a pair of candidate locations (or nodes) on the graph.

The path may comprise edges, or individual segments that extend from one candidate location to another. In some implementations, the path may comprise edges that satisfy one or more requirements. The requirements may include one or more of: straight edges (not curved), a clear line of sight from one candidate location to another with no intervening obstacles, a distance between two candidate locations is less than a threshold distance, the path comprises a minimum possible number of candidate locations, or the path comprises a minimum overall length comprising a sum of length of all edges. For example, two candidate locations may be physically close to one another, but if separated by a wall they are not joined by a single edge.

A candidate location may be deemed to be traversed by a path between a pair of candidate locations when associated with at least two edges for the same path. The candidate locations that comprise the pair would have a single edge associated with each, and thus would not be deemed to be traversed. In other implementations other techniques may be used to determine traversal.

A location score may be calculated. In one implementation, the location score may comprise a count of the path traversals of a particular candidate location. In other implementations other techniques may be used. For example, each edge may have an associated weight or value. The location score may comprise a sum of all weights of all edges associated with a particular candidate location. In another example, the location score may comprise a sum of the edges for all possible paths that include the particular candidate location in the path.

The location score for a particular candidate location may be used to determine if the particular candidate location is a constraint location. For example, if the location score exceeds a threshold value, the candidate location associated with that score may be designated as a constraint location 130. In other implementations a candidate location that exhibits a local maxima of location score may be determined to be the constraint location 130.

The constraint location data 128 is indicative of the constraint locations 130 determined by the constraint location module 126. During operation, the robot 104 or associated devices may use the constraint location data 128 for various purposes. For example, an autonomous navigation module may use the constraint location data 128 to plan the route of the robot 104. The planned route may specify that stopping is not allowed in areas within a threshold distance of a constraint location 130, may specify one or more of a maximum speed or a minimum speed within the threshold distance of the constraint location 130, and so forth.

The constraint location data 128 may also be used to facilitate data acquisition by the robot 104. In one implementation, an otherwise idle robot 104 may proceed to a wait location 134. The wait location 134 may be positioned such that it is in line of sight of one or more constraint locations 130 as determined by the constraint location module 126. The robot 104 may be moved to the wait location 134 and may acquire sensor data for the constraint location 130. In some implementations, the sensor data may be processed and used to determine whether the constraint location 130 that was observed should be retained, removed from the constraint location data 128, and so forth. For example, if the sensor data indicates that no user was detected during a period of time at the candidate location, the associated location score may be decreased, the constraint location 130 may be removed from the constraint location data 128, and so forth.

In another implementation the user may affirmatively approve the robot 104 to gather data in the environment 102. For example, the robot 104 may be instructed to learn who the users are in the environment 102 as quickly and unobtrusively as possible. The robot 104 may be positioned such that one or more constraint locations 130 are within a field of view (FOV) of one or more sensors. The constraint locations 130 may be expected to be points at which users are more likely to pass through, compared to other areas in the environment 102. As a result, the robot 104 may be more easily able to acquire data about users by obtaining sensor data about a constraint location 130.

By using the techniques and systems described in this disclosure, the robot 104 is able to move about the environment 102 in a way that avoids blocking the movement of other users. Use of the constraint locations 130 improves the ability of the robot 104 to safely and effectively operate around and with users by constraining the movement of the robot 104 in areas associated with the constraint locations 130.

In some implementations the constraint location module 126 may use other cost maps 120 to determine constraint locations 130. For example, the constraint location module 126 may use the network map 120(2) to determine constraint locations 130(1). The candidate locations may be assessed based on the availability of the wireless network, and a graph comprising those locations determined. Candidate locations may be discarded that do not provide a minimum level of availability, such as received signal strength. The resulting graph may be representative of routes through the environment 102 that provide for a maximum amount of network connectivity. The robot 104 may then be constrained to have a preference to move within these areas, while avoiding discretionary stops in the areas associated with the constraint locations 130.

The robot 104 may use the network interfaces 110 to connect to a network 136. For example, the network 136 may comprise a wireless local area network, that in turn is connected to a wide area network such as the Internet.

The robot 104 may be configured to dock or connect to a docking station 138. The docking station 138 may also be connected to the network 136. For example, the docking station 138 may be configured to connect to the wireless local area network such that the docking station 138 and the robot 104 may communicate. The docking station 138 may provide external power which the robot 104 may use to charge the battery 106.

The robot 104 may access one or more servers 140 via the network 136. For example, the robot 104 may utilize a wake word detection module to determine if the user is addressing a request to the robot 104. The wake word detection module may hear a specified word or phrase, transition the robot 104 or portion thereof to the wake operating mode. Once in the wake mode, the robot 104 may then transfer at least a portion of the audio spoken by the user to one or more servers 140 for further processing. The servers 140 may process the spoken audio and return to the robot 104 data that may be subsequently used to operate the robot 104.

In some implementations, one or more of the functions associated with the constraint location module 126 may be performed by one or more servers 140. For example, the occupancy map 120(1) representative of the environment 102 may be sent to the servers 140 that execute a constraint location module 126 to determine the constraint location data 128 associated with the environment 102. The constraint location data 128 may then be sent to the robot 104 for subsequent use.

The robot 104 may also communicate with other devices 142. The other devices 142 may include home automation controls, sensors, and so forth that are within the home or associated with operation of one or more devices in the home. For example, the other devices 142 may include a doorbell camera, a garage door, a refrigerator, washing machine, a network connected microphone, and so forth. In some implementations the other devices 142 may include other robots 104, vehicles, and so forth.

In other implementations, other types of autonomous mobile devices (AMD) may use the systems and techniques described herein. For example, the AMD may comprise an autonomous ground vehicle that is moving on a street, an autonomous aerial vehicle in the air, autonomous marine vehicle, and so forth.

Figure 2:
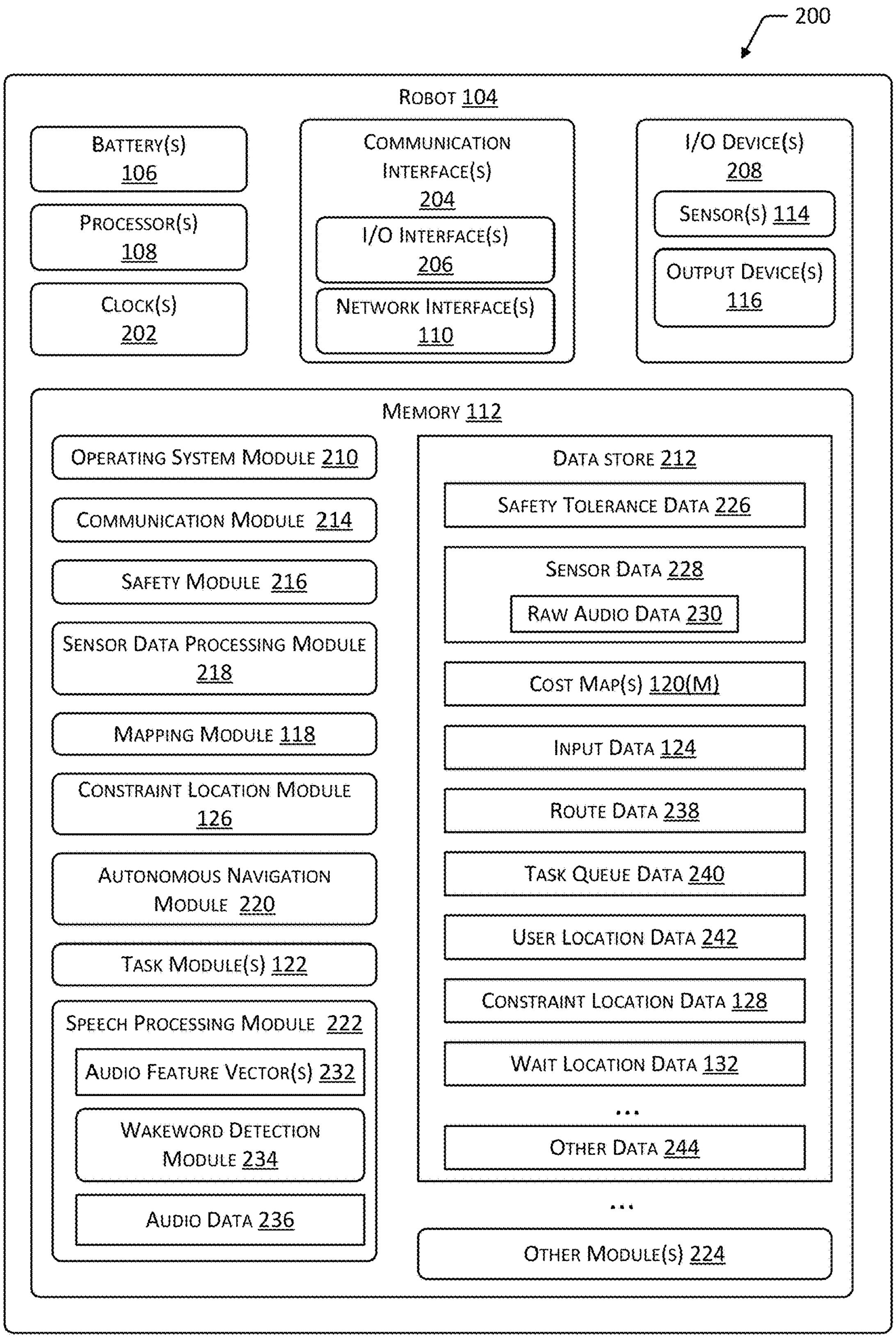
FIG. 2 is a block diagram of the components of the autonomous mobile device, according to some implementations.

FIG. 2 is a block diagram 200 of the robot 104, according to some implementations. The robot 104 may include one or more batteries 106 to provide electrical power suitable for operating the components in the robot 104. In some implementations other devices 142 may be used to provide electrical power to the robot 104. For example, power may be provided by wireless power transfer, capacitors, fuel cells, storage flywheels, and so forth.

The robot 104 may include one or more hardware processors 108 (processors) configured to execute one or more stored instructions. The processors 108 may comprise one or more cores. The processors 108 may include microcontrollers, systems on a chip, field programmable gate arrays, digital signal processors, graphic processing units, general processing units, and so forth. One or more clocks 202 may provide information indicative of date, time, ticks, and so forth. For example, the processor 108 may use data from the clock 202 to associate a particular interaction with a particular point in time.

The robot 104 may include one or more communication interfaces 204 such as input/output (I/O) interfaces 206, network interfaces 110, and so forth. The communication interfaces 204 enable the robot 104, or components thereof, to communicate with other devices 142 or components. The communication interfaces 204 may include one or more I/O interfaces 206. The I/O interfaces 206 may comprise Inter-Integrated Circuit (I2C), Serial Peripheral Interface bus (SPI), Universal Serial Bus (USB) as promulgated by the USB Implementers Forum, RS-232, and so forth.

The I/O interfaces 206 may couple to one or more I/O devices 208. The I/O devices 208 may include input devices such as one or more of a sensor 114, keyboard, mouse, scanner, and so forth. The I/O devices 208 may also include output devices 116 such as one or more of a motor, light, speaker, display, projector, printer, and so forth. In some embodiments, the I/O devices 208 may be physically incorporated with the robot 104 or may be externally placed.

The network interfaces 110 may be configured to provide communications between the robot 104 and other devices 142 such as other robots 104, a docking station 138, routers, access points, and so forth. The network interfaces 110 may include devices configured to couple to personal area networks (PANs), local area networks (LANs), wireless local area networks (WLANS), wide area networks (WANs), and so forth. For example, the network interfaces 110 may include devices compatible with Ethernet, WI-FI, BLUETOOTH, BLUETOOTH Low Energy, ZIGBEE, and so forth.

The robot 104 may also include one or more buses or other internal communications hardware or software that allow for the transfer of data between the various modules and components of the robot 104.

As shown in FIG. 2, the robot 104 includes one or more memories 112. The memory 112 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 112 provides storage of computer-readable instructions, data structures, program modules, and other data for the operation of the robot 104. A few example functional modules are shown stored in the memory 112, although the same functionality may alternatively be implemented in hardware, firmware, or as a system on a chip (SoC).

The memory 112 may include at least one operating system (OS) module 210. The OS module 210 is configured to manage hardware resource devices such as the I/O interfaces 206, the I/O devices 208, the communication interfaces 204, and provide various services to applications or modules executing on the processors 108. The OS module 210 may implement a variant of the FREEBSD operating system as promulgated by the FREEBSD Project; other UNIX or UNIX-like variants; a variation of the LINUX operating system as promulgated by Linus Torvalds; the WINDOWS operating system from MICROSOFT Corporation of Redmond, Wash., USA; the Robot Operating System (ROS) as promulgated at www.ros.org, and so forth.

Also stored in the memory 112 may be a data store 212 and one or more of the following modules. These modules may be executed as foreground applications, background tasks, daemons, and so forth. The data store 212 may use a flat file, database, linked list, tree, executable code, script, or other data structure to store information. In some implementations, the data store 212 or a portion of the data store 212 may be distributed across one or more other devices 142 including other robots 104, servers 140, network attached storage devices, and so forth.

A communication module 214 may be configured to establish communication with other devices 142, such as other robots 104, an external server 140, a docking station 138, and so forth. The communications may be authenticated, encrypted, and so forth.

Other modules within the memory 112 may include a safety module 216, a sensor data processing module 218, the mapping module 118, an autonomous navigation module 220, the one or more task modules 122, the constraint location module 126, a speech processing module 222, or other modules 224. The modules may access data stored within the data store 212, such as safety tolerance data 226, sensor data 228, the cost maps 120, the input data 124, task queue data 240, user location data 242, constraint location data 128, or other data 244.

The safety module 216 may access safety tolerance data 226 to determine within what tolerances the robot 104 may operate safely within the physical environment 102. For example, the safety module 216 may be configured to stop the robot 104 from moving when an extensible mast is extended. In another example, the safety tolerance data 226 may specify a minimum sound threshold which, when exceeded, stops all movement of the robot 104. Continuing this example, detection of sound such as a human yell would stop the robot 104. In another example, the safety module 216 may access safety tolerance data 226 that specifies a minimum distance from an object that the robot 104 may maintain. Continuing this example, when a sensor 114 detects an object has approached to less than the minimum distance, all movement of the robot 104 may be stopped. Movement of the robot 104 may be stopped by one or more of inhibiting operations of one or more of the motors, issuing a command to stop motor operation, disconnecting power from one or more the motors, and so forth. The safety module 216 may be implemented as hardware, software, or a combination thereof.

Stops initiated by the safety module 216 may be considered non-discretionary stops. For example, the robot 104 will stop to avoid colliding with a user, but the autonomous navigation module 220 had not previously scheduled a stop at the point where the robot 104 stopped to avoid the collision.

The safety module 216 may control other factors, such as a maximum speed of the robot 104 based on information obtained by the sensors 114, precision and accuracy of the sensor data 228, and so forth. For example, detection of an object by an optical sensor may include some error, such as when the distance to an object comprises a weighted average between the object and a background. As a result, the maximum speed permitted by the safety module 216 may be based on one or more factors such as the weight of the robot 104, nature of the floor, distance to object, and so forth. In the event that the maximum permissible speed differs from the maximum speed permitted by the safety module 216, the lesser speed may be utilized.

The sensor data processing module 218 may access sensor data 228 that is acquired from one or more the sensors 114. The sensor data processing module 218 may provide various processing functions such as de-noising, filtering, change detection, and so forth. Processing of sensor data 228, such as images from a camera sensor, may be performed by a module implementing, at least in part, one or more of the following tools or techniques. In one implementation, processing of the image data may be performed, at least in part, using one or more tools available in the OpenCV library as developed by INTEL Corporation of Santa Clara, Calif., USA; WILLOW GARAGE of Menlo Park, Calif., USA; and ITSEEZ of Nizhny Novgorod, Russia, with information available at www.opencv.org. In another implementation, functions available in the OKAO machine vision library as promulgated by OMRON Corporation of Kyoto, Japan, may be used to process the sensor data 228. In still another implementation, functions such as those in the Machine Vision Toolbox (MVTB) available using MATLAB as developed by MATHWORKS, Inc. of Natick, Mass., USA, may be utilized.

Techniques such as artificial neural networks (ANNs), convolutional neural networks (CNNs), active appearance models (AAMs), active shape models (ASMs), principal component analysis (PCA), cascade classifiers, and so forth, may also be used to process the sensor data 228 or other data 244. For example, the ANN may be a trained using a supervised learning algorithm such that object identifiers are associated with images of particular objects within training images provided to the ANN. Once trained, the ANN may be provided with the sensor data 228 and produce output indicative of the object identifier.

The sensor data processing module 218 may use data from the sensors 114 on the robot 104 or other sensors 114 in the environment 102 to determine the user location data 242 indicative of a user location in the environment 102. The user location data 242 may be indicative of coordinates within the environment 102 that are indicative of a point associated with the user. For example, the user location data 242 may indicate a centroid of the area occupied by the user with respect to a fixed coordinate system used to represent locations within the environment 102.

The mapping module 118 may operate as described above to generate the occupancy map 120(1), or other cost maps 120(M).

The autonomous navigation module 220 provides the robot 104 with the ability to navigate within the physical environment 102 without real-time human interaction. The autonomous navigation module 220 may implement, or operate in conjunction with, the mapping module 118 to determine the occupancy map 120(1) or other representation of the physical environment 102. In one implementation, the mapping module 118 may use one or more simultaneous localization and mapping ("SLAM") techniques. The SLAM algorithms may utilize one or more of maps, algorithms, beacons, or other techniques to provide navigational data. The navigational data may then be used to determine the route data which is then subsequently used to determine a set of commands that drive the motors connected to the wheels. For example, the autonomous navigation module 220 may determine a location with the environment 102, estimate a path to a destination, and so forth.

The robot 104 autonomous navigation module 220 may generate route data 238 that is indicative of a route through the environment 102 from a current location to a destination. For example, the route data 238 may comprise information indicative of a series of waypoints within the environment, information indicative of limits to the speed of the robot 104 during particular portions of the route, and so forth. The autonomous navigation module 220 may use the constraint location data 128 to determine the route data 238. In some implementations the route data 238 may comprise movement instructions that, when executed by one or more processors 108 of the robot 104, control the movement of the robot 104.

In one implementation the autonomous navigation module 220 may be configured to determine a route that avoids passing within a threshold distance of a constraint location 130 indicated by the constraint location data 128. For example, the robot 104 may avoid coming within 30 cm of a constraint location 130.

In some circumstances the robot 104 may be permitted to follow a route that passes through an area that is associated with a constraint location 130. For example, if the cost of an alternative route is greater than a threshold value, the robot 104 may determine a route that passes within 30 cm of the constraint location 130.

In another implementation the autonomous navigation module 220 may be configured to avoid having the route stop within a threshold distance of the constraint location 130. For example, the autonomous navigation module 220 may receive instructions to go to a specified location. If the specified location is within a threshold distance of the constraint location 130, or is otherwise within an area associated with the constraint location 130 within which no discretionary stopping is permitted, the autonomous navigation module 220 may determine an alternative location that is beyond the threshold distance or outside of the no discretionary stopping area. The route data 238 may then comprise a route that ends at the alternative location.

The autonomous navigation module 220 may determine route data 238 that specifies one or more of a minimum speed, a maximum speed, or a range of speeds that the robot 104 is permitted to travel at for one or more portions of the route. In one implementation, the speed for a portion of the route that passes within a threshold distance of the constraint location 130 may be determined to be greater than or equal to a specified minimum speed, less than a specified maximum speed, or within a range of speeds. For example, the route data 238 may specify that the robot 104 is to travel at no less than 1 meter per second (m/s) and no more than 3 m/s when the route is within 30 cm of the constraint location 130.

The autonomous navigation module 220 may use data indicative of a current location and accept the wait location data 132 as a destination, and then determine the route data 238 that describes a route to the wait location 134.

The autonomous navigation module 220 may include an obstacle avoidance module. For example, if an obstacle is detected along a planned path, the obstacle avoidance module may re-route the robot 104 to move around the obstacle or take an alternate path.

The autonomous navigation module 220 may utilize various techniques during processing of sensor data 228. For example, image data obtained from cameras on the robot 104 may be processed to determine one or more of corners, edges, planes, and so forth. In some implementations corners may be detected and the coordinates of those corners may be used to produce point cloud data.

The occupancy map 120(1) or other cost maps 120(M) may be manually or automatically determined. For example, during a learning phase, the user may take the robot 104 on a tour of the environment 102, allowing the robot 104 to generate the occupancy map 120(1) and associated data, such as tags designating a particular room, such as "kitchen" or "bedroom". In another example, during subsequent operation the robot 104 may generate the occupancy map 120(1) that is indicative of locations of obstacles such as chairs, doors, stairwells, and so forth as it moves unattended through the environment 102.

In some implementations, the occupancy map 120(1) may include floor characterization data. The floor characterization data is indicative of one or more attributes of the floor at a particular location within the physical environment 102. During operation of the robot 104, floor characterization data may be obtained. The floor characterization data may be utilized by one or more of safety module 216, the autonomous navigation module 220, the task module 122, or other modules 224. For example, the floor characterization data may be used to determine if an unsafe condition occurs such as a wet floor. In another example, the floor characterization data may be used by the autonomous navigation module 220 to assist in the determination of the current location of the robot 104 within the home. For example, if the autonomous navigation module 220 determines that the robot 104 is located in the dining room, but the floor characterization data indicates that the floor is consistent with the living room, an error condition may be generated in which other techniques are used to determine the location of the robot 104 or otherwise resolve the difference. For example, the robot 104 may attempt to return to the docking station 138 and then, using information about the path traveled, determine the previously ambiguous location within the home.

The floor characterization data may include one or more of a location designator, floor type, floor texture, coefficient of friction, surface resistivity, color, and so forth. The location designator may be specified based on input from the user. For example, the robot 104 may use speech synthesis to ask the user "what room is this?" during a training phase. The utterance of the user may be received by the microphone array and the audio data "this is the living room" may processed and subsequently used to generate the location designator.

The autonomous navigation module 220 may be used to move the robot 104 from a first location to a second location within the physical environment 102. This movement may be responsive to a determination made by an onboard processor 108, in response to a command received via one or more communication interfaces 204 or a sensor 114, and so forth. For example, an external server 140 may send a command that is subsequently received using a network interface 110. This command may direct the robot 104 to proceed to a designated destination, such as "living room" or "dining room". The robot 104 may then process this command, and use the autonomous navigation module 220 to determine the directions and distances associated with reaching the specified destination.

The memory 112 may store one or more task modules 122. The task module 122 comprises instructions that, when executed, provide one or more functions associated with a particular task. In one example, the task may comprise a security or sentry task in which the robot 104 travels throughout the physical environment 102 avoiding users and looking for events that exceed predetermined thresholds. In another example, the task may comprise a "follow me" feature in which the robot 104 follows a user using a follow behavior.

In some implementations, the robot 104 may be determined to be idle based on the task queue data 240. Tasks that are to be performed may be enqueued in the task queue data 240. The task module 122 may then read the queue and process the enqueued tasks. If the task queue data 240 is empty, or the next enqueued task is not scheduled for execution for a period of time that is greater than a threshold value from the current time, the robot 104 may be deemed to be idle and the autonomous navigation module 220 may be used to move the robot 104 to the wait location 134.

The speech processing module 222 may be used to process utterances of the user. Microphones may acquire audio in the presence of the robot 104 and may send raw audio data 230 to an acoustic front end (AFE). The AFE may transform the raw audio data 230 (for example, a single-channel, 16-bit audio stream sampled at 16 kHz), captured by the microphone, into audio feature vectors 232 that may ultimately be used for processing by various components, such as a wakeword detection module 234, speech recognition engine, or other components. The AFE may reduce noise in the raw audio data 230. The AFE may also perform acoustic echo cancellation (AEC) or other operations to account for output audio data that may be sent to a speaker of the robot 104 for output. For example, the robot 104 may be playing music or other audio that is being received from a network 136 in the form of output audio data. To avoid the output audio interfering with the device's ability to detect and process input audio, the AFE or other component may perform echo cancellation to remove the output audio data from the input raw audio data 230, or other operations.

The AFE may divide the audio data into frames representing time intervals for which the AFE determines a number of values (i.e., features) representing qualities of the raw audio data 230, along with a set of those values (i.e., a feature vector or audio feature vector 232) representing features/qualities of the raw audio data 230 within each frame. A frame may be a certain period of time, for example a sliding window of 25 ms of audio data 236 taken every 10 ms, or the like. Many different features may be determined, as known in the art, and each feature represents some quality of the audio that may be useful for automatic speech recognition (ASR) processing, wakeword detection, presence detection, or other operations. A number of approaches may be used by the AFE to process the raw audio data 230, such as mel-frequency cepstral coefficients (MFCCs), log filter-bank energies (LFBEs), perceptual linear predictive (PLP) techniques, neural network feature vector techniques, linear discriminant analysis, semi-tied covariance matrices, or other approaches known to those skilled in the art.

The audio feature vectors 232 (or the raw audio data 230) may be input into a wakeword detection module 234 that is configured to detect keywords spoken in the audio. The wakeword detection module 234 may use various techniques to determine whether audio data 236 includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the robot 104 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the robot 104 (or separately from speech detection), the robot 104 may use the wakeword detection module 234 to perform wakeword detection to determine when a user intends to speak a command to the robot 104. This process may also be referred to as keyword detection, with the wakeword being a specific example of a keyword. Specifically, keyword detection is typically performed without performing linguistic analysis, textual analysis, or semantic analysis. Instead, incoming audio (or audio data 236) is analyzed to determine if specific characteristics of the audio match preconfigured acoustic waveforms, audio signatures, or other data to determine if the incoming audio "matches" stored audio data 236 corresponding to a keyword.

Thus, the wakeword detection module 234 may compare audio data 236 to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid deep neural network (DNN) Hidden Markov Model (HMM) decoding framework. In another embodiment, the wakeword spotting system may be built on DNN/recursive neural network (RNN) structures directly, without HMM involved. Such a system may estimate the posteriors of wakewords with context information, either by stacking frames within a context window for DNN, or using RNN. Following on, posterior threshold tuning or smoothing is applied for decision making. Other techniques for wakeword detection, such as those known in the art, may also be used.

Once the wakeword is detected, circuitry or applications of the local robot 104 may "wake" and begin transmitting audio data 236 (which may include one or more audio feature vectors 232 or the raw audio data 230) to one or more server(s) 140 for speech processing. The audio data 236 corresponding to audio obtained by the microphone may be sent to a server 140 for routing to a recipient device or may be sent to the server 140 for speech processing for interpretation of the included speech (either for purposes of enabling voice-communications and/or for purposes of executing a command in the speech). The audio data 236 may include data corresponding to the wakeword, or the portion of the audio data 236 corresponding to the wakeword may be removed by the local robot 104 prior to sending.

The robot 104 may connect to the network 136 using one or more of the network interfaces 110. One or more servers 140 may provide various functions, such as ASR, natural language understanding (NLU), providing content such as audio or video to the robot 104, and so forth.

The other modules 224 may provide other functionality, such as object recognition, speech synthesis, user identification, and so forth. For example, an automated speech recognition (ASR) module may accept as input raw audio data 230 or audio feature vectors 232 and may produce as output a text string that is further processed and used to provide input, a task module 122, and so forth. In one implementation, the text string may be sent via a network 136 to a server 140 for further processing. The robot 104 may receive a response from the server 140 and present output, perform an action, and so forth. For example, the raw audio data 230 may include the user saying "robot go to the dining room". The audio data 236 representative of this utterance may be sent to the server 140 that returns commands directing the robot 104 to the dining room of the home associated with the robot 104.

The utterance may result in a response from the server 140 that directs operation of other devices 142 or services. For example, the user may say "robot wake me at seven tomorrow morning". The audio data 236 may be sent to the server 140 that determines the intent and generates commands to instruct a device attached to the network 136 to play an alarm at 7:00 am the next day.

The other modules 224 may comprise a speech synthesis module that is able to convert text data to human speech. For example, the speech synthesis module may be used by the robot 104 to provide speech that a user is able to understand.

The data store 212 may store other data 244 as well. For example, localization settings may indicate local preferences such as language. User identifier data may be stored that allows for identification of a particular user. In some implementations data, such as the user location data 242, cost maps 120 such as the historical interaction location map 120(5) and so forth may be associated with or indicative of the particular user identifier. For example, the historical interaction location cost map 120(5) may contain data that indicates interactions with respect to particular user identifiers.

Figure 3:
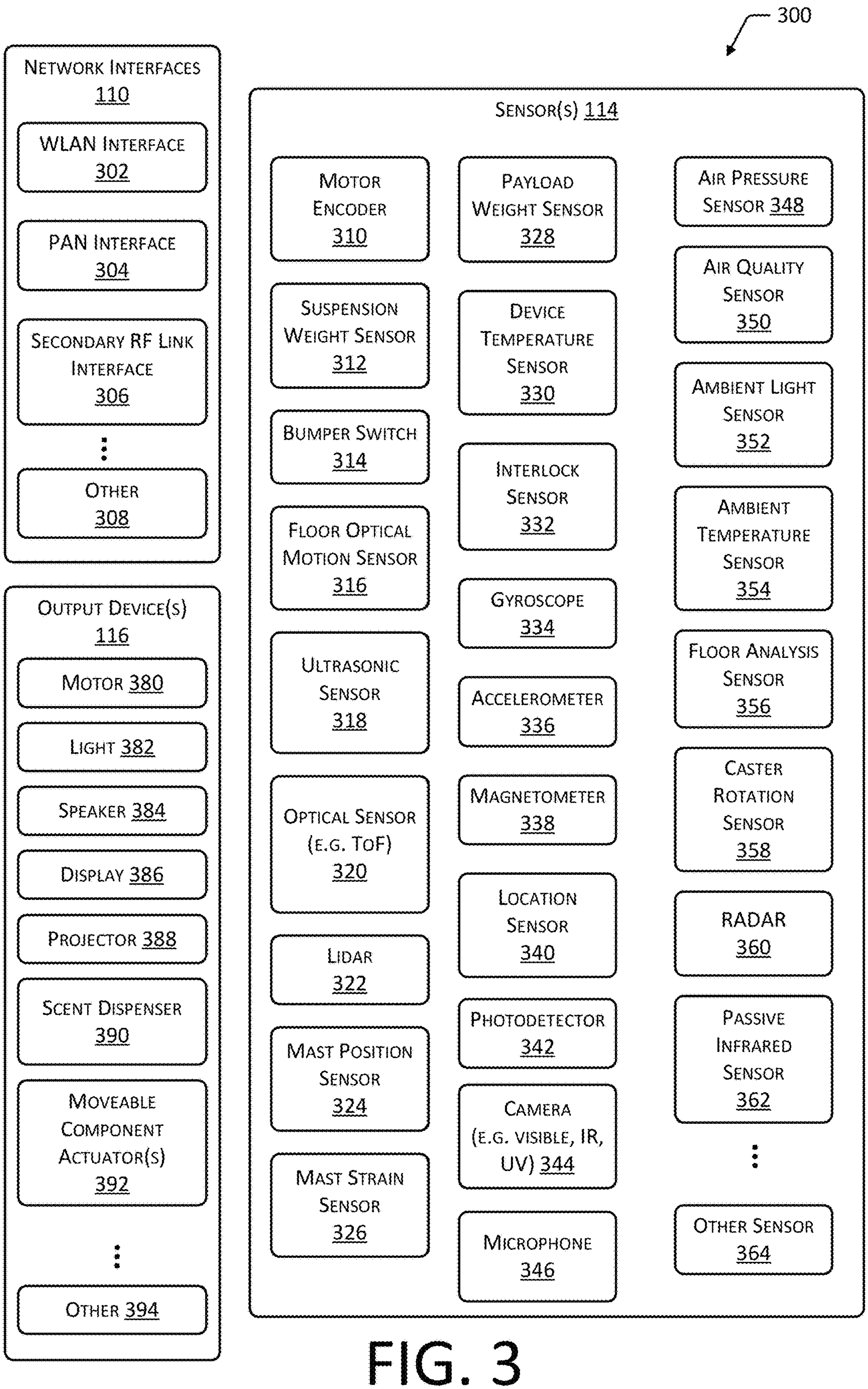
FIG. 3 is a block diagram of some components of the autonomous mobile device such as network interfaces, sensors, and output devices, according to some implementations.

FIG. 3 is a block diagram 300 of some components of the robot 104 such as network interfaces 110, sensors 114, and output devices 116, according to some implementations. The components illustrated here are provided by way of illustration and not necessarily as a limitation. For example, the robot 104 may utilize a subset of the particular network interfaces 110, output devices 116, or sensors 114 depicted here, or may utilize components not pictured. One of more of the sensors 114, output devices 116, or a combination thereof may be included on a moveable component that may be panned, tilted, rotated, or any combination thereof with respect to a chassis of the robot 104.

The network interfaces 110 may include one or more of a WLAN interface 302, PAN interface 304, secondary radio frequency (RF) link interface 306, or other interface 308. The WLAN interface 302 may be compliant with at least a portion of the Wi-Fi specification. For example, the WLAN interface 302 may be compliant with the least a portion of the IEEE 802.11 specification as promulgated by the Institute of Electrical and Electronics Engineers (IEEE). The PAN interface 304 may be compliant with at least a portion of one or more of the BLUETOOTH, wireless USB, Z-Wave, ZIGBEE, or other standards. For example, the PAN interface 304 may be compliant with the BLUETOOTH Low Energy (BLE) specification.

The secondary RF link interface 306 may comprise a radio transmitter and receiver that operate at frequencies different from or using modulation different from the other interfaces. For example, the WLAN interface 302 may utilize frequencies in the 2.4 GHz and 5 GHz Industrial Scientific and Medicine (ISM) bands, while the PAN interface 304 may utilize the 2.4 GHz ISM bands. The secondary RF link interface 306 may comprise a radio transmitter that operates in the 900 MHz ISM band, within a licensed band at another frequency, and so forth. The secondary RF link interface 306 may be utilized to provide backup communication between the robot 104 and other devices 142 in the event that communication fails using one or more of the WLAN interface 302 or the PAN interface 304. For example, in the event the robot 104 travels to an area within the physical environment 102 that does not have Wi-Fi coverage, the robot 104 may use the secondary RF link interface 306 to communicate with another device such as a specialized access point, docking station 138, or other robot 104.

The other 308 network interfaces may include other equipment to send or receive data using other wavelengths or phenomena. For example, the other 308 network interface may include an ultrasonic transceiver used to send data as ultrasonic sounds, a visible light system that communicates via by modulating a visible light source such as a light-emitting diode, and so forth. In another example, the other 308 network interface may comprise a wireless wide area network (WWAN) interface or a wireless cellular data network interface. Continuing the example, the other 308 network interface may be compliant with at least a portion of the 3G, 4G, LTE, or other standards.

The robot 104 may include one or more of the following sensors 114. The sensors 114 depicted here are provided by way of illustration and not necessarily as a limitation. It is understood other sensors 114 may be included or utilized by the robot 104, while some sensors 114 may be omitted in some configurations.

A motor encoder 310 provides information indicative of the rotation or linear extension of a motor. The motor may comprise a rotary motor, or a linear actuator. In some implementations, the motor encoder 310 may comprise a separate assembly such as a photodiode and encoder wheel that is affixed to the motor. In other implementations, the motor encoder 310 may comprise circuitry configured to drive the motor. For example, the autonomous navigation module 220 may utilize the data from the motor encoder 310 to estimate a distance traveled.

A suspension weight sensor 312 provides information indicative of the weight of the robot 104 on the suspension system for one or more of the wheels or the caster. For example, the suspension weight sensor 312 may comprise a switch, strain gauge, load cell, photodetector, or other sensing element that is used to determine whether weight is applied to a particular wheel, or whether weight has been removed from the wheel. In some implementations, the suspension weight sensor 312 may provide binary data such as a “1” value indicating that there is a weight applied to the wheel, while a “0” value indicates that there is no weight applied to the wheel. In other implementations, the suspension weight sensor 312 may provide an indication such as so many kilograms of force or newtons of force. The suspension weight sensor 312 may be affixed to one or more of the wheels or the caster. In some situations, the safety module 216 may use data from the suspension weight sensor 312 to determine whether or not to inhibit operation of one or more of the motors. For example, if the suspension weight sensor 312 indicates no weight on the suspension, the implication is that the robot 104 is no longer resting on its wheels, and thus operation of the motors may be inhibited. In another example, if the suspension weight sensor 312 indicates weight that exceeds a threshold value, the implication is that something heavy is resting on the robot 104 and thus operation of the motors may be inhibited.

One or more bumper switches 314 provide an indication of physical contact between a bumper or other member that is in mechanical contact with the bumper switch 314. The safety module 216 may utilize sensor data 228 obtained by the bumper switches 314 to modify the operation of the robot 104. For example, if the bumper switch 314 associated with a front of the robot 104 is triggered, the safety module 216 may initiate a non-discretionary stop, drive the robot 104 backwards, or take other action to avoid or mitigate a collision.

A floor optical motion sensor (FOMS) 316 provides information indicative of motions of the robot 104 relative to the floor or other surface underneath the robot 104. In one implementation, the FOMS 316 may comprise a light source such as light-emitting diode (LED), an array of photodiodes, and so forth. In some implementations, the FOMS 316 may utilize an optoelectronic sensor, such as a low resolution two-dimensional array of photodiodes. Several techniques may be used to determine changes in the data obtained by the photodiodes and translate this into data indicative of a direction of movement, velocity, acceleration, and so forth. In some implementations, the FOMS 316 may provide other information, such as data indicative of a pattern present on the floor, composition of the floor, color of the floor, and so forth. For example, the FOMS 316 may utilize an optoelectronic sensor that may detect different colors or shades of gray, and this data may be used to generate floor characterization data.

An ultrasonic sensor 318 utilizes sounds in excess of 20 kHz to determine a distance from the sensor 114 to an object. The ultrasonic sensor 318 may comprise an emitter such as a piezoelectric transducer and a detector such as an ultrasonic microphone. The emitter may generate specifically timed pulses of ultrasonic sound while the detector listens for an echo of that sound being reflected from an object within the field of view. The ultrasonic sensor 318 may provide information indicative of a presence of an object, distance to the object, and so forth. Two or more ultrasonic sensors 318 may be utilized in conjunction with one another to determine a location within a two-dimensional plane of the object.

In some implementations, the ultrasonic sensor 318 or portion thereof may be used to provide other functionality. For example, the emitter of the ultrasonic sensor 318 may be used to transmit data and the detector may be used to receive data transmitted that is ultrasonic sound. In another example, the emitter of an ultrasonic sensor 318 may be set to a particular frequency and used to generate a particular waveform such as a sawtooth pattern to provide a signal that is audible to an animal, such as a dog or a cat.

An optical sensor 320 may provide sensor data 228 indicative of one or more of a presence or absence of an object, a distance to the object, or characteristics of the object. The optical sensor 320 may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. The optical sensor 320 may utilize one or more sensing elements. For example, the optical sensor 320 may comprise a 4×4 array of light sensing elements. Each individual sensing element may be associated with a field of view (FOV) that is directed in a different way. For example, the optical sensor 320 may have four light sensing elements, each associated with a different 10° FOV, allowing the sensor to have an overall FOV of 40°.

In another implementation, a structured light pattern may be provided by the optical emitter. A portion of the structured light pattern may then be detected on the object using a sensor 114 such as an image sensor or camera 344. Based on an apparent distance between the features of the structured light pattern, the distance to the object may be calculated. Other techniques may also be used to determine distance to the object. In another example, the color of the reflected light may be used to characterize the object, such as whether the object is skin, clothing, flooring, upholstery, and so forth. In some implementations, the optical sensor 320 may operate as a depth camera, providing a two-dimensional image of a scene, as well as data that indicates a distance to each pixel.

Data from the optical sensors 320 may be utilized for collision avoidance. For example, safety module 216 and the autonomous navigation module 220 may utilize the sensor data 228 indicative of the distance to an object in order to prevent a collision with that object.

Multiple optical sensors 320 may be operated such that their FOV overlap at least partially. To minimize or eliminate interference, the optical sensors 320 may selectively control one or more of the timing, modulation, or frequency of the light emitted. For example, a first optical sensor 320 may emit light modulated at 30 kHz while a second optical sensor 320 emits light modulated at 33 kHz.

A lidar 322 sensor provides information indicative of a distance to an object or portion thereof by utilizing laser light. The laser is scanned across a scene at various points, emitting pulses which may be reflected by objects within the scene. Based on the time-of-flight a distance to that particular point, sensor data 228 may be generated that is indicative of the presence of objects and the relative positions, shapes, and so forth is visible to the lidar 322. Data from the lidar 322 may be used by various modules. For example, the autonomous navigation module 220 may utilize point cloud data generated by the lidar 322 for localization of the robot 104 within the physical environment 102.

The robot 104 may include a mast. A mast position sensor 324 provides information indicative of a position of the mast of the robot 104. For example, the mast position sensor 324 may comprise limit switches associated with the mast extension mechanism that indicate whether the mast is an extended or retracted position. In other implementations, the mast position sensor 324 may comprise an optical code on at least a portion of the mast that is then interrogated by an optical emitter and a photodetector to determine the distance which the mast is extended. In another implementation, the mast position sensor 324 may comprise an encoder wheel that is attached to a mast motor that is used to raise or lower the mast. The mast position sensor 324 may provide data to the safety module 216. For example, if the robot 104 is preparing to move, data from the mast position sensor 324 may be checked to determine if the mast is retracted, and if not, the mast may be retracted prior to beginning movement.

A mast strain sensor 326 provides information indicative of a strain on the mast with respect to the remainder of the robot 104. For example, the mast strain sensor 326 may comprise a strain gauge or load cell that measures a side-load applied to the mast or a weight on the mast or downward pressure on the mast. The safety module 216 may utilize sensor data 228 obtained by the mast strain sensor 326. For example, if the strain applied to the mast exceeds a threshold amount, the safety module 216 may direct an audible and visible alarm to be presented by the robot 104.

The robot 104 may include a modular payload bay. A payload weight sensor 328 provides information indicative of the weight associated with the modular payload bay. The payload weight sensor 328 may comprise one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers that generate one or more signals based on an applied force, such as that of the load due to gravity. For example, the payload weight sensor 328 may comprise a load cell having a strain gauge and a structural member that deforms slightly when weight is applied. By measuring a change in the electrical characteristic of the strain gauge, such as capacitance or resistance, the weight may be determined. In another example, the payload weight sensor 328 may comprise a force sensing resistor (FSR). The FSR may comprise a resilient material that changes one or more electrical characteristics when compressed. For example, the electrical resistance of a particular portion of the FSR may decrease as the particular portion is compressed. In some implementations, the safety module 216 may utilize the payload weight sensor 328 to determine if the modular payload bay has been overloaded. If so, an alert or notification may be issued.

One or more device temperature sensors 330 may be utilized by the robot 104. The device temperature sensors 330 provide temperature data of one or more components within the robot 104. For example, a device temperature sensor 330 may indicate a temperature of one or more the batteries 106, one or more motors 380, and so forth. In the event the temperature exceeds a threshold value, the component associated with that device temperature sensor 330 may be shut down.

One or more interlock sensors 332 may provide data to the safety module 216 or other circuitry that prevents the robot 104 from operating in an unsafe condition. For example, the interlock sensors 332 may comprise switches that indicate whether an access panel is open. The interlock sensors 332 may be configured to inhibit operation of the robot 104 until the interlock switch indicates a safe condition is present.

A gyroscope 334 may provide information indicative of rotation of an object affixed thereto. For example, gyroscope 334 may generate sensor data 228 that is indicative of a change in orientation of the robot 104 or portion thereof.

An accelerometer 336 provides information indicative of a direction and magnitude of an imposed acceleration. Data such as rate of change, determination of changes in direction, speed, and so forth may be determined using the accelerometer 336. The accelerometer 336 may comprise mechanical, optical, micro-electromechanical, or devices. For example, the gyroscope 334 in the accelerometer 336 may comprise a prepackaged solid-state inertial measurement unit (IMU) that provides multiple axis gyroscopes 334 and accelerometers 336.

A magnetometer 338 may be used to determine an orientation by measuring ambient magnetic fields, such as the terrestrial magnetic field. For example, the magnetometer 338 may comprise a Hall effect transistor that provides output compass data indicative of a magnetic heading.

The robot 104 may include one or more locations sensors 340. The location sensors 340 may comprise an optical, radio, or other navigational system such as a global positioning system (GPS) receiver. For indoor operation, the location sensors 340 may comprise indoor position systems, such as using Wi-Fi Positioning Systems (WPS). The location sensors 340 may provide information indicative of a relative location, such as "living room" or an absolute location such as particular coordinates indicative of latitude and longitude, or displacement with respect to a predefined origin.

A photodetector 342 may provide sensor data 228 indicative of impinging light. For example, the photodetector 342 may provide data indicative of a color, intensity, duration, and so forth.

A camera 344 generates sensor data 228 indicative of one or more images. The camera 344 may be configured to detect light in one or more wavelengths including, but not limited to, terahertz, infrared, visible, ultraviolet, and so forth. For example, an infrared camera 344 may be sensitive to wavelengths between approximately 700 nanometers and 1 millimeter. The camera 344 may comprise charge coupled devices (CCD), complementary metal oxide semiconductor (CMOS) devices, microbolometers, and so forth. The robot 104 may use image data acquired by the camera 344 for object recognition, navigation, collision avoidance, user communication, and so forth. For example, a pair of cameras 344 sensitive to infrared light may be mounted on the front of the robot 104 to provide binocular stereo vision, with the sensor data 228 comprising images being sent to the autonomous navigation module 220. In another example, the camera 344 may comprise a 10 megapixel or greater camera that is used for videoconferencing or for acquiring pictures for the user.

The camera 344 may include a global shutter or a rolling shutter. The shutter may be mechanical or electronic. A mechanical shutter uses a physical device such as a shutter vane or liquid crystal to prevent light from reaching a light sensor. In comparison, an electronic shutter comprises a specific technique of how the light sensor is read out, such as progressive rows, interlaced rows, and so forth. With a rolling shutter, not all pixels are exposed at the same time. For example, with an electronic rolling shutter, rows of the light sensor may be read progressively, such that the first row on the sensor was taken at a first time while the last row was taken at a later time. As a result, a rolling shutter may produce various image artifacts, especially with regard to images in which objects are moving. In contrast, with a global shutter the light sensor is exposed all at a single time, and subsequently read out. In some implementations, the camera(s) 344, particularly those associated with navigation or autonomous operation, may utilize a global shutter. In other implementations, the camera(s) 344 providing images for use by the autonomous navigation module 220 may be acquired using a rolling shutter and subsequently may be processed to mitigate image artifacts.

One or more microphones 346 may be configured to acquire information indicative of sound present in the physical environment 102. In some implementations, arrays of microphones 346 may be used. These arrays may implement beamforming techniques to provide for directionality of gain. The robot 104 may use the one or more microphones 346 to acquire information from acoustic tags, accept voice input from users, determine ambient noise level, for voice communication with another user or system, and so forth.

An air pressure sensor 348 may provide information indicative of an ambient atmospheric pressure or changes in ambient atmospheric pressure. For example, the air pressure sensor 348 may provide information indicative of changes in air pressure due to opening and closing of doors, weather events, and so forth.

An air quality sensor 350 may provide information indicative of one or more attributes of the ambient atmosphere. For example, the air quality sensor 350 may include one or more chemical sensing elements to detect the presence of carbon monoxide, carbon dioxide, ozone, and so forth. In another example, the air quality sensor 350 may comprise one or more elements to detect particulate matter in the air, such as the photoelectric detector, ionization chamber, and so forth. In another example, the air quality sensor 350 may include a hygrometer that provides information indicative of relative humidity.

An ambient light sensor 352 may comprise one or more photodetectors 342 or other light-sensitive elements that are used to determine one or more of the color, intensity, duration of ambient lighting around the robot 104.

An ambient temperature sensor 354 provides information indicative of the temperature of the ambient environment proximate to the robot 104. In some implementations, an infrared temperature sensor may be utilized to determine the temperature of another object at a distance.

A floor analysis sensor 356 may include one or more components that are used to generate at least a portion of the floor characterization data. In one implementation, floor analysis sensor 356 may comprise circuitry that may be used to determine one or more of the electrical resistance, electrical inductance, or electrical capacitance of the floor. For example, two or more of the wheels in contact with the floor may include an allegedly conductive pathway between the circuitry and the floor. By using two or more of these wheels, the circuitry may measure one or more of the electrical properties of the floor. Information obtained by the floor analysis sensor 356 may be used by one or more of the safety module 216, the autonomous navigation module 220, the task module 122, and so forth. For example, if the floor analysis sensor 356 determines that the floor is wet, the safety module 216 may decrease the speed of the robot 104 and generate a notification alerting the user.

The floor analysis sensor 356 may include other components as well. For example, coefficient of friction sensor may comprise a probe that comes into contact with the surface and determines the coefficient of friction between the probe and the floor.

A caster rotation sensor 358 provides data indicative of one or more of a direction of orientation, angular velocity, linear speed of the caster, and so forth. For example, the caster rotation sensor 358 may comprise an optical encoder and corresponding target that is able to determine that the caster transitioned from an angle of 0° at a first time to 49° at a second time.

The sensors 114 may include a radar 360. The radar 360 may be used to provide information as to a distance, lateral position, and so forth, to an object.

The sensors 114 may include a passive infrared (PIR) sensor 362. The PIR 362 may be used to detect the presence of people, pets, hotspots, and so forth. For example, the PIR 362 may be configured to detect infrared radiation with wavelengths between 8 and 14 micrometers.

The robot 104 may include other sensors 364 as well. For example, a capacitive proximity sensor may be used to provide proximity data to adjacent objects. Other sensors 364 may include radio frequency identification (RFID) readers, near field communication (NFC) systems, coded aperture camera, and so forth. For example, NFC tags may be placed at various points within the physical environment 102 to provide landmarks for the autonomous navigation module 220. One or more touch sensors may be utilized to determine contact with a user or other objects.

The robot 104 may include one or more output devices 116. A motor 380 may be used to provide linear or rotary motion. A light 382 may be used to emit photons. A speaker 384 may be used to emit sound. A display 386 may comprise one or more of a liquid crystal display, light emitting diode display, electrophoretic display, cholesteric liquid crystal display, interferometric display, and so forth. The display 386 may be used to present visible information such as graphics, pictures, text, and so forth. In some implementations, the display 386 may comprise a touchscreen that combines a touch sensor and a display 386.

In some implementations, the robot 104 may be equipped with a projector 388. The projector 388 may be able to project an image on the surface, such as the floor, wall, ceiling, and so forth.

A scent dispenser 390 be used to emit one or more smells. For example, the scent dispenser 390 may comprise a plurality of different scented liquids that may be evaporated or vaporized in a controlled fashion to release predetermined amounts of each.

One or more moveable component actuators 392 may comprise an electrically operated mechanism such as one or more of a motor, solenoid, piezoelectric material, electroactive polymer, shape-memory alloy, and so forth. An actuator controller may be used to provide a signal or other input that operates one or more of the moveable component actuators 392 to produce movement of the moveable component.

In other implementations, other 394 output devices may be utilized. For example, the robot 104 may include a haptic output device that provides output that produces particular touch sensations to the user. Continuing the example, a motor 380 with an eccentric weight may be used to create a buzz or vibration to allow the robot 104 to simulate the purr of a cat.

Figure 4:
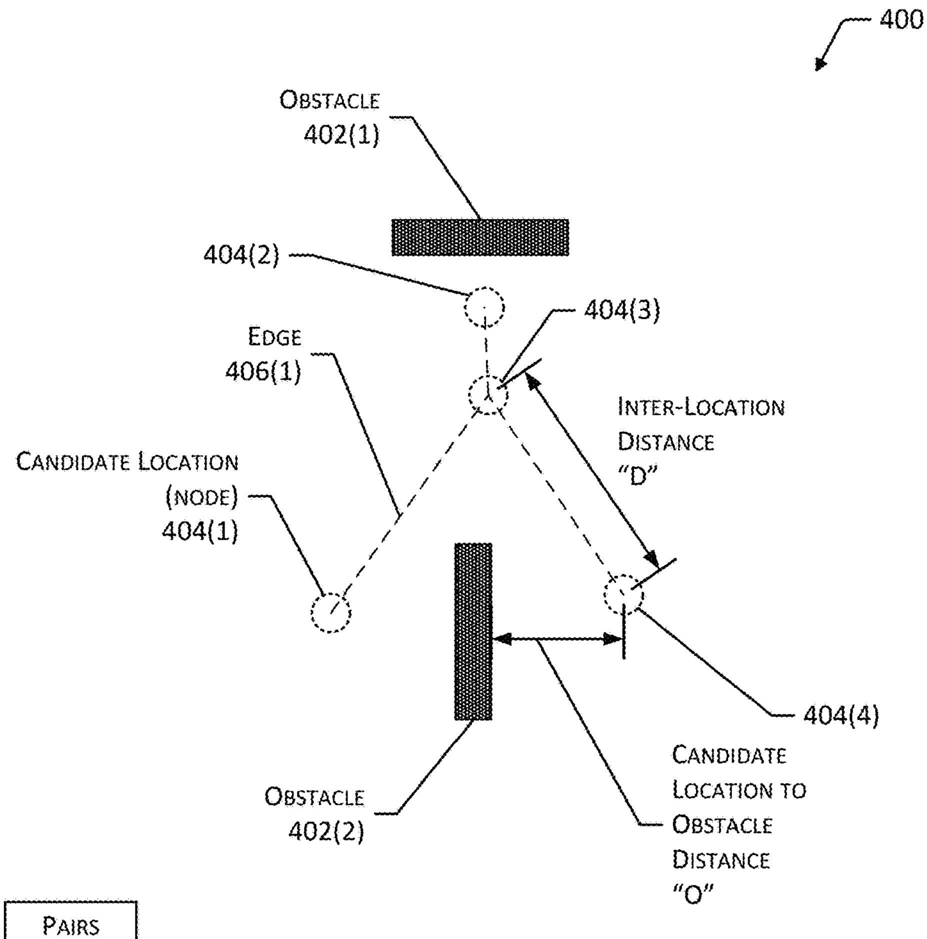
FIG. 4 illustrates determination of a constraint location and a graph comprising a set of candidate locations, according to some implementations.

FIG. 4 illustrates a graph 400 comprising a set of candidate locations and the determination of a constraint location 130, according to some implementations. The operations described may be performed at least in part by the constraint location module 126.

In this illustration, a first obstacle 402(1) and a second obstacle 402(2) are shown. For example, the obstacles 402 may comprise walls, furniture, or other objects that are represented in the occupancy map 120(1).

A set of candidate locations 404 are distributed throughout the environment 102. For example, a Sobol set may be used to pseudo randomly designate candidate locations 404 throughout the environment 102. In another example, other techniques may be used to arrange candidate locations 404 throughout at least a portion of the environment 102. In this illustration, four candidate locations 404(1), 404(2), 404(3), and 404(4) are shown. Candidate location 404(1) and candidate location 404(4) are not within line of sight of one another as they are located on opposite sides of the second obstacle 402(2). In this representation, the candidate locations 404 are nodes in the graph 400.

Edges 406 are shown connecting candidate locations 404. For example, an edge 406(1) connects candidate location 404(1) and 404(3). An inter-location distance "D" is shown. The inter-location distance is indicative of a distance between the candidate locations 404. For example, the distance may be measured in meters. Also shown is a candidate location to obstacle distance "0". The candidate location to obstacle distance is indicative of a distance between a particular candidate location 404 and a nearest obstacle 402 as indicated by the occupancy map 120(1).

Pairs 408 of candidate locations 404 may be enumerated from the set of candidate locations 404. These pairs 408 may be unique in their combination of elements but not their order. For example, a first pair comprising candidate location 404(1) and 404(2) is equivalent to a second pair of candidate location 404(2) and 404(1). For ease of illustration, and not necessarily as a limitation, a pair 408 may be designated using the notation of (a,b) where a is indicative of a candidate location 404 at a first endpoint and b is a candidate location 404 that is at a second endpoint. In this illustration, the graph 400 includes four candidate locations 404 and exhibits seven pairs 408.

For a given pair 408, a path is determined from the first endpoint to the second endpoint. The path comprises edges 406 that extend from one candidate location 404 to another. In some implementations, the path may comprise edges 406 that satisfy one or more requirements. The requirements for construction of the path may include one or more of: straight edges (not curved), a clear line of sight from one candidate location 404 to another with no intervening obstacles, an inter-location distance is less than a threshold distance, the path comprises a minimum possible number of candidate locations, or the path comprises a minimum overall length comprising a sum of length of all edges. For example, candidate location 404(1) is near candidate location 404(4), but is not within line of sight due to the second obstacle 402(2).

In some implementations the path may be a shortest path. The path may be deemed to be shortest if it exhibits a lowest overall total of inter-location distances "D", exhibits a lowest count of interconnecting edges 406, and so forth. In some implementations, the constraint location module 126 may implement one or more of the Dijkstra's algorithm, the A* search algorithm, the Floyd-Warshall algorithm, Johnson's algorithm, the Viterbi algorithm, and so forth to determine the shortest path between a pair 408 of candidate locations on the graph 400.

The set of pairs 408 that have been determined may be processed and a shortest path associated with each pair 408. The constraint location module 126 may calculate a location score for one or more of the candidate locations 404 in the graph 400.

In the implementation depicted here, the location score may comprise a path traversal count 410. The path traversal count 410 is indicative of a number of different paths that traverse a particular candidate location 404. A candidate location 404 may be deemed to be traversed by a path when the candidate location 404 is associated with at least two edges 406 for the same path. The candidate locations 404 that comprise the pair 408 would have a single edge associated with each, and thus would not be deemed to be traversed. For each of the candidate locations 404 that are intermediate along the path, they would exhibit an increase in the path traversal count 410. In this illustration, the candidate location 404(3) exhibits a path traversal count 410 with a value of 3. This is because the paths for pairs 408 (1,4), (1,2), and (2,4) all traverse the candidate location 404(3). In other implementations other techniques may be used to determine traversal.

A candidate location 404 may be deemed to be a constraint location 130 if the associated location score exceeds a threshold value. For example, if the path traversal count is greater than or equal to 3, the candidate location 404 may be determined to be a constraint location 130. In other implementations a top k set of location scores may be selected. For example, the location scores may be sorted in descending order, and the top k (where k is a positive integer value) location scores are determined to be indicative of constraint locations 130. In another example, a top percentile of location scores may be determined to be indicative of constraint locations 130.

In some implementations the location scores may be assessed to find local maxima. For example, the candidate location 404 may be determined to be a constraint location 130 if it has a location score that is greater than a threshold value and is a maximum for the candidate locations 404 that are joined at a distance of 5 or fewer edges 406.

Additional criteria may be used to determine whether a candidate location 404 is eligible to be a constraint location 130. In one implementation candidate locations 404 that are greater than or equal to a threshold distance from a nearest obstacle 402 may be removed from consideration. For example, a candidate location 404 located in a center of an unobstructed room may have a relatively high location score. Continuing the example, assume the threshold distance is a maximum of 1 meter, and the candidate location 404 has a distance "0" of 2 meters from a nearest wall or piece of furniture. Because the candidate location 404 is beyond the threshold distance, it would not be determined to be a constraint location 130. In implementations where the constraint location 130 operates to prevent blocking a path, there is sufficient room for others to move around and past a robot 104 that is in the center of the room, and so a constraint location 130 is not necessary.

Figure 5:
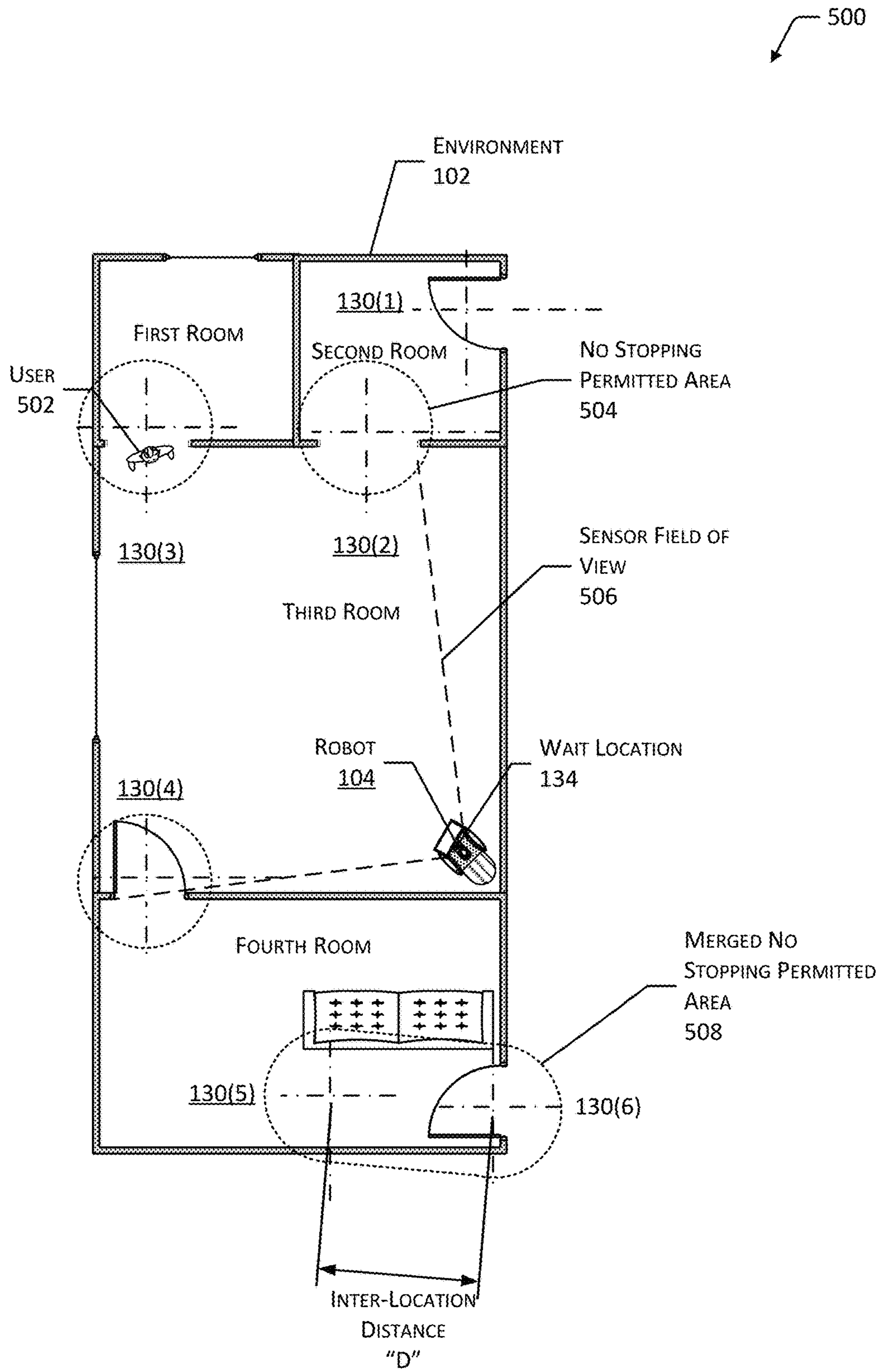
FIG. 5 illustrates a portion of an environment with constraint locations and corresponding no stopping permitted areas as well as orientation of the autonomous mobile device to observe those constraint locations, according to some implementations.

FIG. 5 is an illustration 500 of a portion of an environment 102 with constraint locations 130 and corresponding no stopping permitted areas, as well as orientation of the autonomous mobile device to observe those constraint locations 130, according to some implementations.

As described above, one or more users 502 may move about the environment 102. It is advantageous to avoid having the robot 104 make discretionary stops in areas within the environment 102 that could impede the movement of users 502. For example, the robot 104 should not stop in a doorway unless there is a reason for a non-discretionary stop, such as avoiding collision with the user 502.

Once a constraint location 130 has been determined, a no stopping permitted area (NSPA) 504 may be associated with the constraint location 130. For example, a circular NSPA 504 may be centered on a constraint location 130. In some implementations one or more of the size or shape of the NSPA 504 may be based on the location score. For example, the radius of the circular NSPA 504 may be based on the path traversal count 410 for the candidate location 404 that is now designated as a constraint location 130. As the path traversal count 410 increases, the area of the NSPA 504 for that constraint location 130 may also increase. While the NSPA 504 is depicted as circular, in other implementations other shapes may be used.

Movement of the robot 104 may be constrained within the NSPA 504, or within a threshold distance of the constraint location 130. For example, within the NSPA 504 the robot 104 may be prohibited from making a discretionary stop. In another example, the robot 104 may be constrained to move at no less than a minimum speed and no more than a maximum speed.

Other operations of the robot 104 may also be affected by the constraint location 130. For example, the robot 104 may use one or more output devices 116 while within the NSPA 504 or when within a threshold distance of the constraint location 130. Continuing the example, the robot 104 may emit a sound from a speaker 384 or illuminate a light 382 while moving through the NSPA 504. Such output may be used to advise users 502 of where the robot 104 is when near the constraint location 130. As a result, safety of the user 502 may be improved.

The robot 104 may be positioned at the wait location 134 in a particular orientation. In one implementation, the orientation of the robot 104 may be determined such that a sensor field of view (FOV) 506 of one or more sensors 114 on the robot 104 includes one or more of the constraint locations 130. In this way, the one or more sensors 114 are able to observe the constraint location 130. In one implementation, the robot 104 may observe a particular constraint location 130 for a period of time to determine if it exhibits at least a minimum amount of usage to be designated as a constraint location 130. For example, if the sensor data 228 obtained from the sensors 114 indicates no movement at the constraint location 130 for 60 minutes, the location score associated with the constraint location 130 may be reduced. If subsequent observations at other times reduce the location score below the threshold value, the constraint location 130 may be deemed inactive or may otherwise be disregarded. Continuing the example, that candidate location 404 would no longer be considered a constraint location 130 and the corresponding NSPA 504 would no longer be present.

In some implementations NSPAs 504 that are adjacent to or within a threshold inter-location distance D of one another may be merged to form a merged NSPA 508. For example as shown in this figure, the constraint locations 130(5) and 130(6) are separated by an inter-location distance D that is less than a threshold value. As a result, the NSPAs 504 are merged to form the merged NSPA 508.

Figure 6:
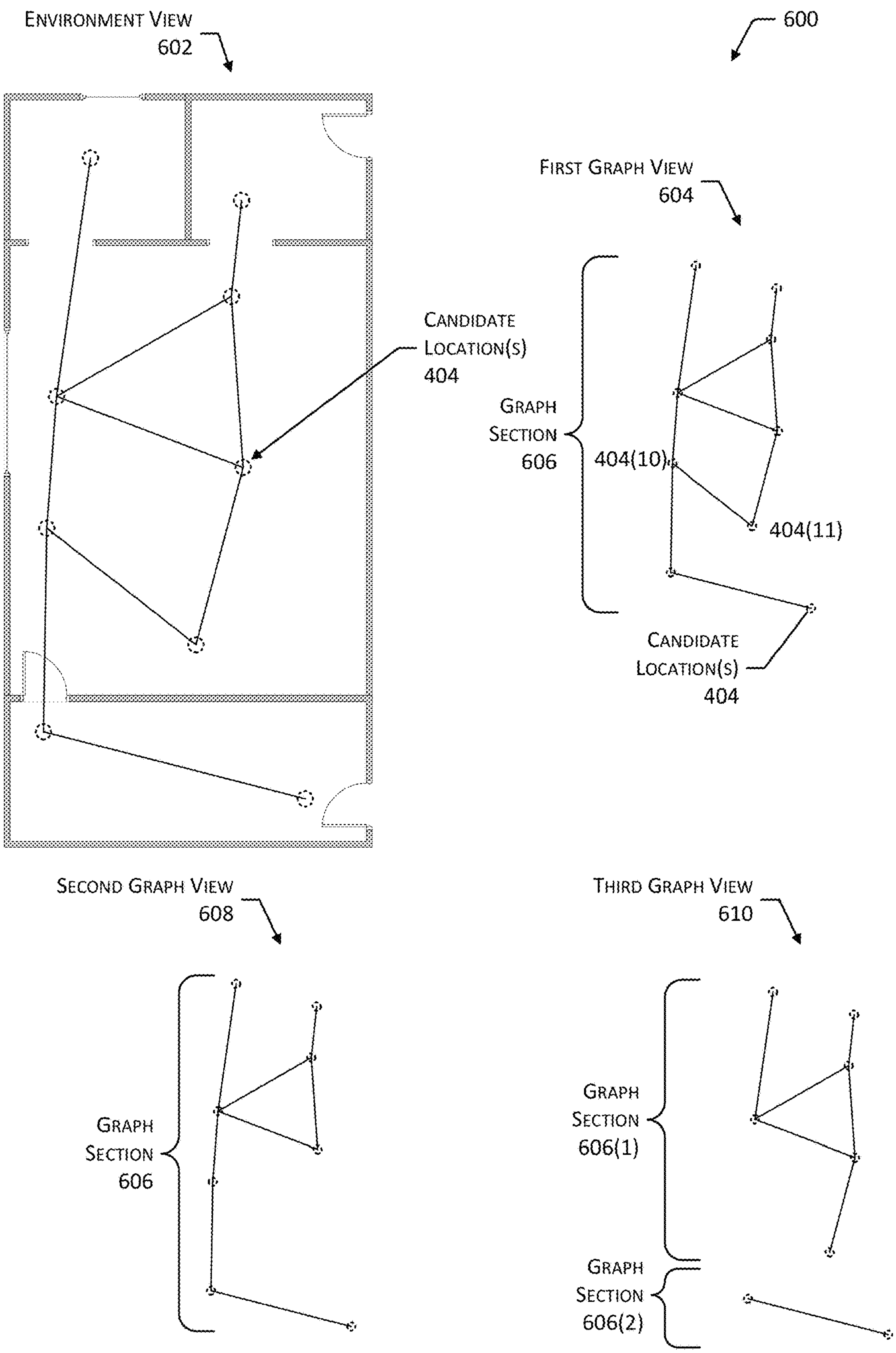
FIG. 6 illustrates determining a constraint location by processing a graph of the candidate locations, according to some implementations.

FIG. 6 is an illustration 600 of determining a constraint location 130 by processing a graph of the candidate locations 404, according to some implementations. In some implementations a constraint location 130 may be determined to be a candidate location 404 or node in the graph that, when removed, separates the graph into two or more isolated graph sections.

An environment view 602 is shown with a set of candidate locations 404 and their associated edges 406 connecting them to form a graph.

A first graph view 604 shows the graph which comprises a single graph section 606. In this single graph section 606, all candidate locations 404 are connected by at least one edge 406 to at least one other candidate location 404. Candidate locations 404(10) and 404(11) are denoted in this figure.

A second graph view 608 depicts the graph after the candidate location 404(11) has been removed from the graph. After the removal, a single graph section 606 remains. As a result, the candidate location 404(11) would not be considered a constraint location 130.

A third graph view 610 depicts the effects of removing the candidate location 404(10). After this removal, the graph has been fractured into two graph sections 606(1) and 606(2). Because the removal of the candidate location 404(10) caused an increase in the number of graph sections 606, the candidate location 404(10) may be determined to be a constraint location 130. A graph may be deemed to be connected when there is a path between every pair of nodes in the graph. In comparison, a graph may be deemed to be disconnected when there are two nodes in the graph that are not endpoints of a contiguous path. In one implementation, the number of graph sections may be expressed as G+1, where G is the number of pairs 408 of candidate locations 404 that contain unreachable endpoints.

The above process may be iterated, with candidate locations 404 deleted individually, and the resulting effects tested to determine how many graph sections 606 remain. Based on these results, the constraint locations 130 may be designated.

Figure 7:
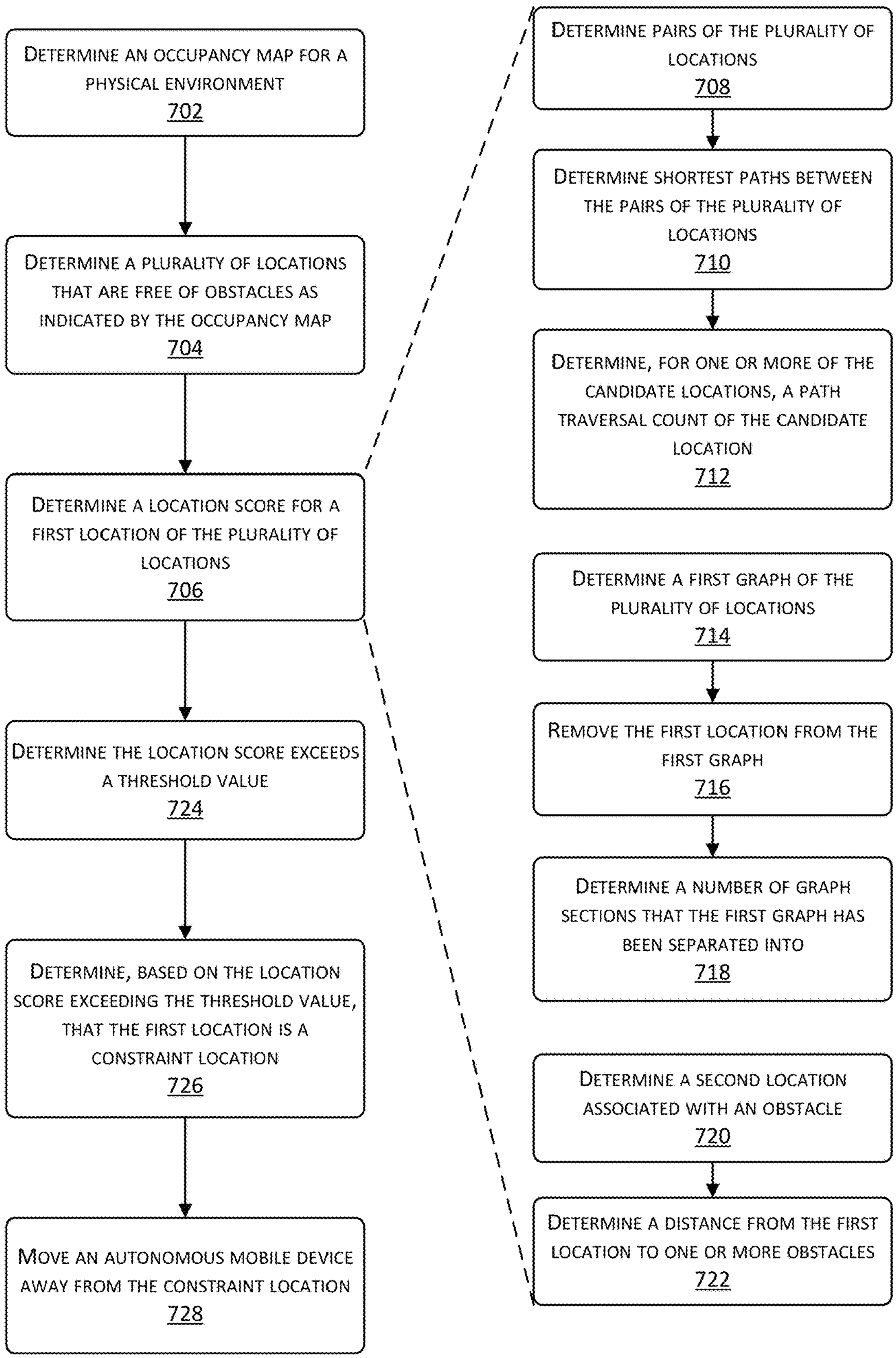
FIG. 7 is a flow diagram of a process to determine constraint locations and control movement of an autonomous mobile device based on those constraint locations, according to some implementations.

FIG. 7 is a flow diagram of a process to determine constraint locations 130 and control movement of an autonomous mobile device based on those constraint locations 130, according to some implementations. The process may be implemented at least in part by one or more of the robot 104, a server 140, or other device 142.

At 702 an occupancy map 120(1) for at least a portion of the physical environment 102 is determined. The occupancy map 120(1) may be indicative of placement of one or more obstacles 402 that impede movement in the physical environment 102. In one implementation the occupancy map 120(1) comprises a plurality of cells with each cell of the plurality of cells representing a particular area in the physical environment 102 and having an obstacle cost value that is indicative of whether the cell is able to be traversed by the robot 104. For example, the occupancy map 120(1) may be indicative of a first area and a second area in the physical environment 102. The first area has a first obstacle cost value that is indicative of whether the first area contains an obstacle 402 and the second area has a second obstacle cost value that is indicative of whether the second area contains an obstacle 402.

In one implementation, image data obtained by one or more cameras 344 may be used to determine an occupancy map 120(1) of the physical environment 102 that is indicative of a first area and a second area in the physical environment 102. The first area may have a first obstacle cost value that is indicative of whether the first area contains an obstacle 402 and the second area has a second obstacle cost value that is indicative of whether the second area contains an obstacle 402.

At 704 one or more candidate locations 404 are determined that are free of obstacles 402 as indicated by the occupancy map 120(1). For example, a Sobol function may be used to pseudo randomly distribute potential candidate locations with respect to the occupancy map 120(1) or another representation of the environment 102. In other implementations, the potential candidate locations may be distributed in a regular pattern. The potential candidate locations that are located within an area that has an obstacle cost value exceeding a threshold value may be disregarded, and the remaining used as the candidate locations 404. In another implementation, the candidate locations 404 may be specified positions within a room, such as in corners formed by walls, manually specified by a user 502, and so forth.

Continuing the example, the first and second obstacle cost values may be below a threshold value, indicating that the first area within which the first candidate location 404(1) is located and the second area within which the second candidate location 404(2) is located are free from obstacles.

At 706 location scores for one or more of the candidate locations 404 are determined. The location score for a particular candidate location 404 may representative of one or more of centrality, connectivity, or other graph metrics of that particular candidate location 404 with regard to the other candidate locations 404. In some implementations, the location score may be based at least in part on one or more factors.

As described at 708-712, a first factor of the location score may be centrality of the candidate location 404, such as indicated by a number of paths that traverse the candidate location 404. At 708 pairs 408 of the plurality of candidate locations 404 are determined. The pairs 408 may be unique in their combination of elements but not their order. For example, a first pair comprising candidate location 404(1) and 404(2) is equivalent to a second pair of candidate location 404(2) and 404(1) and is a different pair from 404(3) and 404(2).

At 710 a set of paths are determined between at least a portion of the pairs 408. In one implementation, for each pair 408, a shortest path between the endpoints designated in the pair 408 is determined. For example, one or more of the Dijkstra's algorithm, the A* search algorithm, the Floyd-Warshall algorithm, Johnson's algorithm, the Viterbi algorithm, and so forth may be used to determine the shortest path between the pair 408 of candidate locations 404.

At 712, a count of the number of path traversals 410 of a particular candidate location 404 is determined. The location score may be based on the number of path traversals 410. For example, as the number of path traversals 410 increases, the location score may increase.

As described at 714-718, a second factor for the determination of the location score may be connectivity of the graph. At 714 a first graph of the plurality of locations that are free of obstacles is determined. The first graph is connected, in that a path exists between all pairs of candidate locations 404 in the first graph. At 716 the first candidate location 404 is removed from the first graph. At 718 a number of graph sections that the first graph has been separated into is determined. For example, if the removal of the first candidate location 404 has disconnected one graph section 606(1) from another graph section 606(2), the first graph now exhibits two graph sections. The location score may be based on the number of graph sections 606 resulting from removal of the first candidate location 404. For example, as the number of graph sections 606 increases, the location score may increase.

As described at 720-722, a third factor for the determination of the location score may be the distance between a candidate location 404 and an obstacle 402. At 720 a second location associated with an obstacle 402 is determined. For example, the second location may be in a second area of the physical environment 102 that has an obstacle cost value that is greater than an obstacle threshold value.

At 722 a distance is determined between the first candidate location 404 and the obstacle 402. The location score may be based on the distance. For example, as the distance to a nearest obstacle decreases, the location score may increase.

Other factors that may be used to determine the location score include data from one or more of the cost maps 120. The movement map 120(3) may be used to determine the location score. In one implementation, as the level of movement associated with an area increases, the location score for the candidate location 404 in that area may increase. In another implementation, the level of movement associated with an area in which an endpoint of a pair 408 is present may be used to determine the location score. For example, if an endpoint of a pair 408 is in an area that has a high level of movement based on the movement map 120(3), the location score of all candidate nodes 404 in that path may be increased.

The other factors may include data obtained from other sensors in the environment 102. For example, stationary devices such as internet enabled appliances may be used to obtain data that is indicative of movement of the user 502 within the environment 102. This information may then be used to determine the movement map 120(3).

The location score for a candidate location 404 may be based on one or more of these factors. In other implementations other techniques or factors may be used. For example, each edge 406 may have an associated weight or value. The location score may comprise a sum of all weights of all edges 406 associated with a particular candidate location 404. In another example, the location score may comprise a sum of the edges for all possible paths that include the particular candidate location 404 in the path.

At 724 a first candidate location 404 is determined to have a location score that exceeds a threshold value. For example, the location score may exceed a fixed value, may be in a top k number of values of location scores, may be within a specified percentile of location scores, and so forth. In some implementations the location score may be deemed to exceed a threshold value if it is determined to be a local maxima. For example, the location score of one candidate location 404 may be compared to the location scores of candidate locations 404 that are connected to the one candidate location 404, out to a maximum number of edges 406.

At 726, based on the location score exceeding the threshold value, the candidate location 404 is determined to be a constraint location 130.

At 728 movement of the robot 104 is constrained based on the constraint locations 130. The autonomous navigation module 220 may use the constraint location data 128 that is indicative of constraint locations 130 for route planning, and to avoid making discretionary stops within the no stopping permitted areas (NSPA) 504, within a threshold distance of the constraint locations 130, and so forth. For example, the robot 104 may be given instructions to move to a location that is greater than a threshold distance away from the constraint location 130. In another example, the speed of the robot 104 may be constrained while in the NSPA 504. For example, the robot 104 may be instructed to maintain a minimum speed, instructed to not exceed a maximum speed, and so forth. In other implementations other actions may be taken by the robot 104 based on the constraint locations 130. For example, the robot 104 may be instructed to present output using one or more of the output devices 116 when approaching or within an NSPA 504. In other implementations, the robot 104 may be instructed to proceed to a wait location 134 and acquire sensor data 228 about a constraint location 130.

Figure 8:
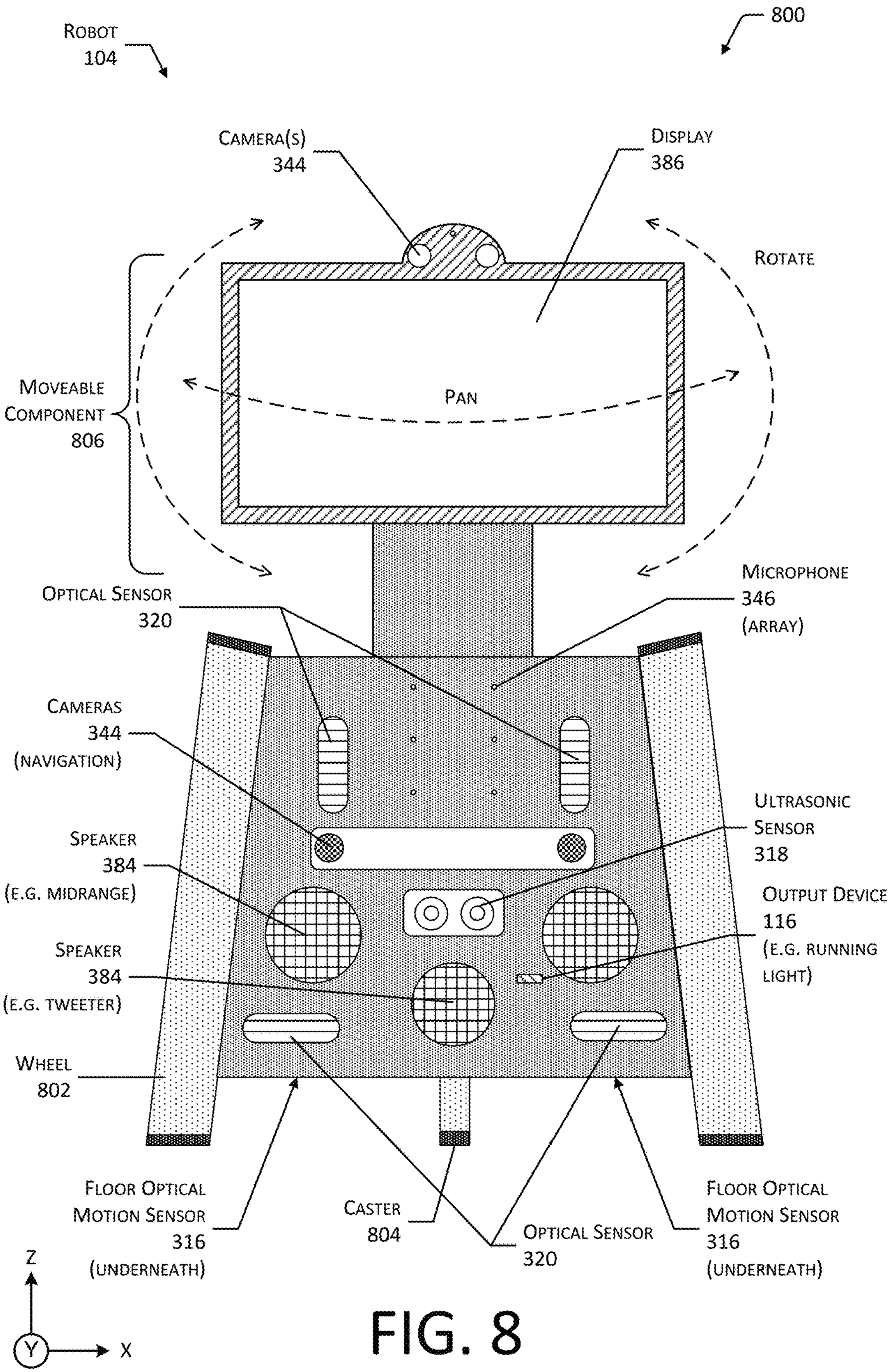
FIG. 8 is a front view of the autonomous mobile device, according to some implementations.

FIG. 8 is a front view 800 of the robot 104, according to some implementations. In this view, the wheels 802 are depicted on the left and right sides of a lower structure. As illustrated here, the wheels 802 are canted inwards towards an upper structure. In other implementations, the wheels 802 may be mounted vertically. The caster 804 is visible along the midline. The front section of the robot 104 includes a variety of sensors 114. A first pair of optical sensors 320 are located along the lower edge of the front while a second pair of optical sensors 320 are located along an upper portion of the front. Between a second set of the optical sensors 320 is a microphone 346 (array).

In some implementations, one or more microphones 346 may be arranged within or proximate to the display 386. For example, a microphone 346 array may be arranged within the bezel of the display 386.

A pair of cameras 344 separated by a distance are mounted to the front of the robot 104 and provide for stereo vision. The distance or "baseline" between the pair of cameras 344 may be between 5 and 15 centimeters (cm). For example, the pair of cameras 344 may have a baseline of 10 cm. In some implementations, these cameras 344 may exhibit a relatively wide horizontal field-of-view (HFOV). For example, the HFOV may be between 90° and 110°. A relatively wide FOV allows for easier detection of moving objects, such as users or pets that may be in the path of the robot 104. Also, the relatively wide FOV facilitates the robot 104 being able to detect objects when turning.

The sensor data 228 comprising images produced by this pair of cameras 344 can be used by the autonomous navigation module 220 for navigation of the robot 104. The cameras 344 used for navigation may be of different resolution from, or sensitive to different wavelengths than, cameras 344 used for other purposes such as video communication. For example, the navigation cameras 344 may be sensitive to infrared light allowing the robot 104 to operate in darkness, while the camera 344 mounted above the display 386 may be sensitive to visible light and is used to generate images suitable for viewing by a person. Continuing the example, the navigation cameras 344 may have a resolution of at least 300 kilopixels each while the camera 344 mounted above the display 386 may have a resolution of at least 10 megapixels. In other implementations, navigation may utilize a single camera 344.

The robot 104 may comprise a moveable component 806. In one implementation, the moveable component 806 may include the display 386 and cameras 344 arranged above the display 386. The cameras 344 may operate to provide stereo images of the physical environment 102, the user 502, and so forth. For example, an image from each of the cameras 344 above the display 386 may be accessed and used to generate stereo image data about a face of a user 502. This stereo image data may then be used to facial recognition, user identification, gesture recognition, gaze tracking, and so forth. In other implementations, a single camera 344 may be present above the display 386.

The moveable component 806 is mounted on a movable mount that allows for movement with respect to the chassis of the robot 104. The movable mount may allow the moveable component 806 to be moved by the moveable component actuators 392 along one or more degrees of freedom. For example, the moveable component 806 may pan, tilt, and rotate as depicted here. The size of the moveable component 806 may vary. In one implementation, the display 386 in the moveable component 806 may be approximately 8 inches as measured diagonally from one corner to another.

An ultrasonic sensor 318 is also mounted on the front of the robot 104 and may be used to provide sensor data 228 that is indicative of objects in front of the robot 104.

One or more speakers 384 may be mounted on the robot 104. For example, pyramid range speakers 384 are mounted on the front of the robot 104 as well as a high range speaker 384 such as a tweeter. The speakers 384 may be used to provide audible output such as alerts, music, human speech such as during a communication session with another user 502, and so forth.

One or more bumper switches 314 (not shown) may be present along the front of the robot 104. For example, a portion of the housing of the robot 104 that is at the leading edge may be mechanically coupled to one or more bumper switches 314.

Other output devices 116, such as one or more lights 382, may be on an exterior of the robot 104. For example, a running light 382 may be arranged on a front of the robot 104. The running light 382 may provide light for operation of one or more of the cameras 344, a visible indicator to the user 502 that the robot 104 is in operation, and so forth.

One or more of the FOMS 316 are located on an underside of the robot 104.

Figure 9:
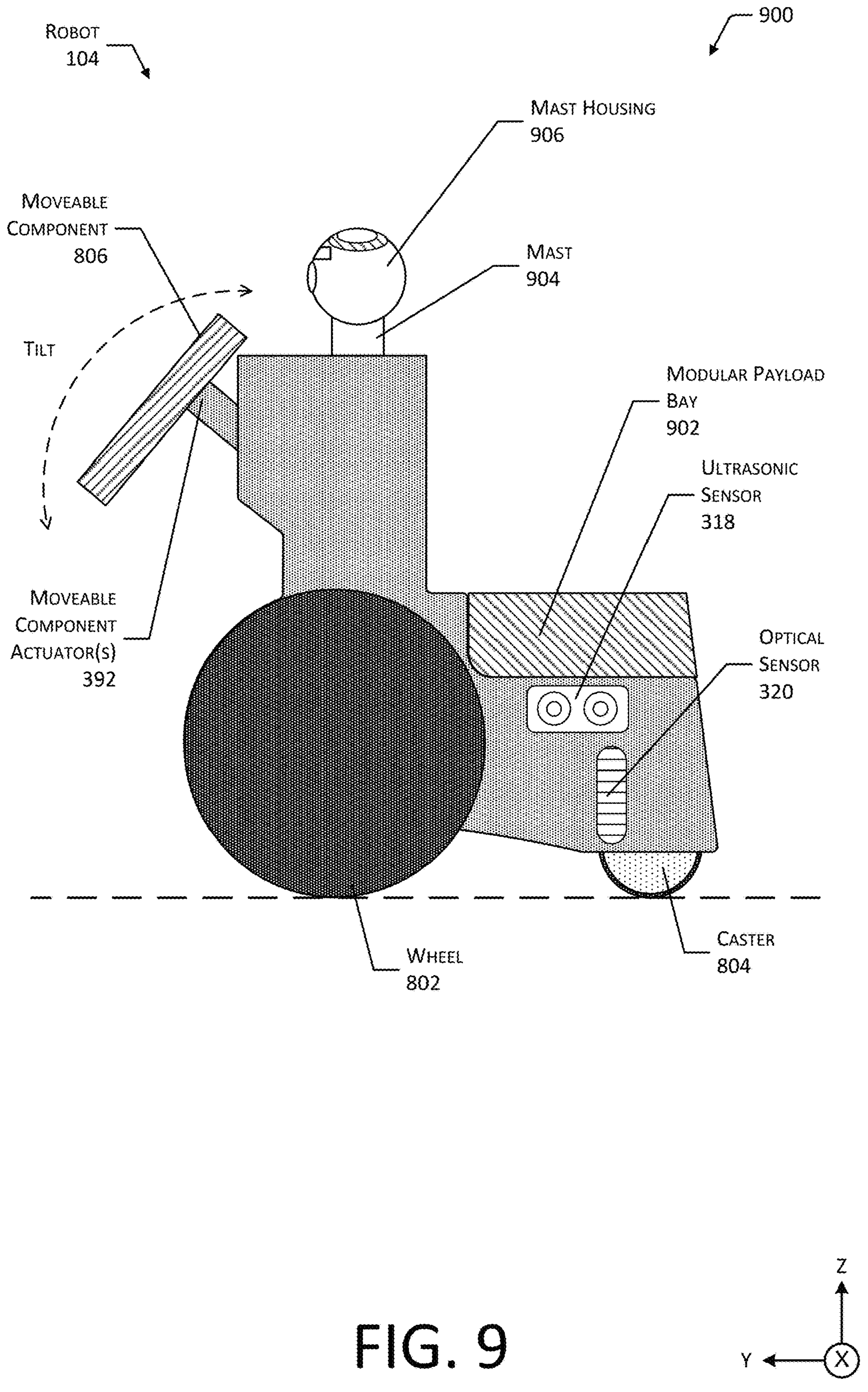
FIG. 9 is a side view of the autonomous mobile device, according to some implementations.

FIG. 9 is a side view 900 of the robot 104, according to some implementations.

The exterior surfaces of the robot 104 may be designed to minimize injury in the event of an unintended contact between the robot 104 and a user 502 or a pet. For example, the various surfaces may be angled, rounded, or otherwise designed to divert or deflect an impact. In some implementations, the housing of the robot 104, or a surface coating may comprise an elastomeric material or a pneumatic element. For example, the outer surface of the housing of the robot 104 may be coated with a viscoelastic foam. In another example, the outer surface of the housing of the robot 104 may comprise a shape-memory polymer that upon impact forms but then over time returns to the original shape.

In this side view, the left side of the robot 104 is depicted. An ultrasonic sensor 318 and an optical sensor 320 are present on either side of the robot 104.

In this illustration, the caster 804 is shown in a trailing configuration, in which the caster 804 is located behind or aft of the axle of the wheels 802. In another implementation (not shown) the caster 804 may be in front of the axle of the wheels 802. For example, the caster 804 may be a leading caster 804 positioned forward of the axle of the wheels 802.

The robot 104 may include a modular payload bay 902 located within the lower structure. The modular payload bay 902 provides one or more of mechanical or electrical connectivity with the robot 104. For example, the modular payload bay 902 may include one or more engagement features such as slots, cams, ridges, magnets, bolts, and so forth that are used to mechanically secure an accessory within the modular payload bay 902. In one implementation, the modular payload bay 902 may comprise walls within which the accessory may sit. In another implementation, the modular payload bay 902 may include other mechanical engagement features such as slots into which the accessory may be slid and engage.

The modular payload bay 902 may include one or more electrical connections. For example, the electrical connections may comprise a universal serial bus (USB) connection that allows for the transfer of data, electrical power, and so forth between the robot 104 and the accessory.

As described above, the robot 104 may incorporate a moveable component 806 that includes a display 386 which may be utilized to present visual information to the user 502. In some implementations, the moveable component 806 may be located with or affixed to the upper structure. In some implementations, the display 386 may comprise a touch screen that allows user input to be acquired. The moveable component 806 is mounted on a movable mount that allows motion along one or more axes. For example, the movable mount may allow the moveable component 806 to be panned, tilted, and rotated by the moveable component actuators 392. The moveable component 806 may be moved to provide a desired viewing angle to the user 502, to provide output from the robot 104, and so forth. For example, the output may comprise the moveable component 806 being tilted forward and backward to provide a gestural output equivalent to a human nodding their head, or panning to face the user 502.

The robot 104 may incorporate a mast 904. The mast 904 provides a location from which additional sensors 114 or output devices 116 may be placed at a higher vantage point. The mast 904 may be fixed or extensible. The extensible mast 904 is depicted in this illustration. The extensible mast 904 may be transitioned between a retracted state, an extended state, or placed at some intermediate value between the two.

At the top of the mast 904 may be a mast housing 906. In this illustration, the mast housing 906 is approximately spherical, however in other implementations other physical form factors such as cylinders, squares, or other shapes may be utilized.

The mast housing 906 may contain one or more sensors 114. For example, the sensors 114 may include a camera 344 having a sensor field-of-view (FOV) 506. In another example, the sensors 114 may include an optical sensor 320 to determine a distance to an object. The optical sensor 320 may look upward, and may provide information as to whether there is sufficient clearance above the robot 104 to deploy the mast 904. In another example, the mast housing 906 may include one or more microphones 346.

One or more output devices 116 may also be contained by the mast housing 906. For example, the output devices 116 may include a camera flash used to provide illumination for the camera 344, an indicator light that provides information indicative of a particular operation of the robot 104, and so forth.

Other output devices 116, such as one or more lights 382, may be elsewhere on an exterior of the robot 104. For example, a light 382 may be arranged on a side of the upper structure.

In some implementations, one or more of the sensors 114, output device 116, or the mast housing 906 may be movable. For example, the motor 380 may allow for the mast 904, the mast housing 906, or a combination thereof to be panned allowing the sensor FOV 506 to move from left to right.

In some implementations, the moveable component 806 may be mounted to the mast 904. For example, the moveable component 806 may be affixed to the mast housing 906. In another example, the moveable component 806 may be mounted to a portion of the mast 904, and so forth.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:

determining an occupancy map associated with a physical environment, the occupancy map comprising obstacle cost values associated with particular areas within the physical environment;

determining a first location in a first area of the physical environment, the first area having a first obstacle cost value that is less than an obstacle threshold value;

determining a plurality of locations within the physical environment;

determining a first number of paths that extend between pairs of locations in the plurality of locations, wherein each path of the first number of paths traverses the first location;

determining a first location score for the first location based on the first number of paths;

determining the first location score exceeds a first threshold value;

determining the first location is a constraint location based at least in part on the first location score; and prohibiting a device from passing through or stopping within the first area, based on the determining that the first location is the constraint location.

2. The method of claim 1, wherein the determining the first location score for the first location further comprises:

determining a first graph of the plurality of locations that includes the first location;

removing the first location from the first graph; and determining a number of graph sections that the first graph has been separated into.

3. The method of claim 1, wherein the determining the first location score for the first location further comprises:

determining a second location in a second area of the physical environment, the second area having a second obstacle cost value that is greater than the obstacle threshold value; and determining a first distance between the first location and the second location.

4. The method of claim 1, further comprising:

determining route data indicative of a route through the physical environment from a second location to a third location, wherein the route is based at least in part on the occupancy map and avoids passing within a threshold distance of the first location.

5. The method of claim 1, further comprising:

determining a first speed;

determining route data indicative of a route through the physical environment from a second location to a third location;

determining a portion of the route passes within a threshold distance of the first location;

determining, for the portion of the route, a speed value that is greater than or equal to the first speed; and generating movement instructions that are indicative of the speed value for the portion of the route.

6. The method of claim 1, further comprising:

determining a first speed;

determining first route data indicative of a route through the physical environment from a second location to a third location;

determining the third location is within a threshold distance of the first location;

determining a fourth location that is greater than the threshold distance from the first location; and determining second route data indicative of a route through the physical environment from the second location to the fourth location.

7. The method of claim 1, further comprising:

acquiring sensor data from a first time to a second time; and determining, based on the sensor data, a number of users within a threshold distance of the first location; and wherein the determining the first location is the constraint location is further based at least in part on the number of users exceeding a second threshold value.

8. The method of claim 1, wherein the determining that the first location is the constraint location further comprises:

determining a second location in a second area of the physical environment, the second area having a second obstacle cost value that is greater than the obstacle threshold value;

determining a first distance from the first location to the second area; and determining that the first distance is less than a threshold distance.

9. A system comprising:

one or more memories storing first computer-executable instructions; and one or more processors to execute the first computer-executable instructions to:

determine an occupancy map associated with a physical environment, the occupancy map comprising obstacle cost values associated with particular areas within the physical environment;

determine a first location in a first area of the physical environment, the first area having a first obstacle cost value that is less than an obstacle threshold value;

determine a plurality of locations within the physical environment;

determine a first graph of the plurality of locations that includes the first location;

remove the first location from the first graph;

determine a number of graph sections that the first graph has been separated into;

determine a first location score for the first location;

determine the first location score exceeds a first threshold value;

determine the first location is a constraint location; and prohibit a device from passing through or stopping within the first area, based on the first location being the constraint location.

10. The system of claim 9, the one or more processors to further execute the first computer-executable instructions to:

determine a first number of paths that extend between pairs of locations in the plurality of locations, wherein each path of the first number of paths traverses the first location; and wherein the first location score is based at least in part on the first number of paths.

11. The system of claim 9, wherein:

the first location score is based at least in part on the number of graph sections.

12. The system of claim 9, the one or more processors to further execute the first computer-executable instructions to:

determine a second location in a second area of the physical environment, the second area having a second obstacle cost value that is greater than the obstacle threshold value; and determine a first distance between the first location and the second location; and wherein the first location score is based at least in part on the first distance.

13. The system of claim 9, the one or more processors to further execute the first computer-executable instructions to:

determine route data indicative of a route through the physical environment from a second location to a third location, wherein the route data is based at least in part on the occupancy map and prevents a discretionary stop at the second location that is within a threshold distance of the first location.

14. The system of claim 9, the one or more processors to further execute the first computer-executable instructions to:

determine the device is within a first distance of the first location;

determine the first distance is less than a threshold distance;

determine a second location that is greater than the threshold distance away from the first location; and move the device to the second location.

15. The system of claim 9, the one or more processors to further execute the first computer-executable instructions to:

determine a second location that is at least a first distance from the first location; and move the device to the second location.

16. The system of claim 9, the one or more processors to further execute the first computer-executable instructions to:

receive sensor data acquired by a sensor of the device from a first time to a second time; and determine, based on the sensor data, a number of users within a threshold distance of the first location; and wherein the determination of the first location as the constraint location is further based at least in part on the number of users exceeding a second threshold value.

17. The system of claim 9, the first computer-executable instructions to determine the constraint location further comprising instructions to:

determine a distance from the first location to a closest obstacle in the physical environment in a second area within the occupancy map that has a second obstacle cost value that is greater than the obstacle threshold value; and determine the distance is less than a threshold distance.

18. A system comprising:

one or more memories storing first computer-executable instructions; and one or more processors to execute the first computer-executable instructions to:

determine an occupancy map associated with a physical environment, the occupancy map comprising obstacle cost values associated with particular areas within the physical environment;

determine a first location in a first area of the physical environment, the first area having a first obstacle cost value that is less than an obstacle threshold value;

determine a first location score for the first location;

determine the first location score exceeds a first threshold value;

determine that the first location is a constraint location based at least in part on the first location score;

determine a device is within a first distance of the first location;

determine the first distance is less than a threshold distance;

determine a second location that is greater than the threshold distance away from the first location; and move the device to the second location.

19. The system of claim 18, the one or more processors to further execute the first computer-executable instructions to:

determine a third location in a second area of the physical environment, the second area having a second obstacle cost value that is greater than the obstacle threshold value;

determine a second distance from the first location to the second area; and determine that the second distance is less than the threshold distance.

20. The system of claim 18, the one or more processors to further execute the first computer-executable instructions to:

determine a plurality of locations within the physical environment; and determine a first number of paths that extend between pairs of locations in the plurality of locations, wherein each path of the first number of paths traverses the first location; and wherein the first location score is based at least in part on the first number of paths.

* * * * *